(12) United States Patent
Watanabe

(10) Patent No.: US 12,505,955 B2
(45) Date of Patent: Dec. 23, 2025

(54) MULTILAYER CERAMIC ELECTRONIC COMPONENT

(71) Applicant: Murata Manufacturing Co., Ltd., Nagaokakyo (JP)

(72) Inventor: Hiroto Watanabe, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 107 days.

(21) Appl. No.: 18/619,241

(22) Filed: Mar. 28, 2024

(65) Prior Publication Data

US 2025/0279240 A1 Sep. 4, 2025

(30) Foreign Application Priority Data

Feb. 29, 2024 (JP) .................. 2024-030487

(51) Int. Cl.
*H01G 4/232* (2006.01)
*H01G 4/12* (2006.01)
*H01G 4/30* (2006.01)

(52) U.S. Cl.
CPC ........... *H01G 4/232* (2013.01); *H01G 4/1245* (2013.01); *H01G 4/30* (2013.01)

(58) Field of Classification Search
CPC ......... H01G 4/232; H01G 4/1245; H01G 4/30
See application file for complete search history.

(56) References Cited

U.S. PATENT DOCUMENTS

| | | | |
|---|---|---|---|
| 10,026,556 B2* | 7/2018 | Ando | H01G 4/232 |
| 2014/0151101 A1* | 6/2014 | Lee | H01G 4/12 |
| | | | 156/89.12 |
| 2014/0326493 A1* | 11/2014 | Lee | H05K 1/0306 |
| | | | 361/301.4 |
| 2015/0053472 A1* | 2/2015 | Lee | H01G 4/232 |
| | | | 361/301.4 |
| 2015/0098202 A1* | 4/2015 | Lee | H01G 4/232 |
| | | | 361/761 |
| 2015/0109718 A1* | 4/2015 | Choi | H01G 4/30 |
| | | | 174/258 |
| 2018/0082787 A1* | 3/2018 | Hamamori | H01G 4/232 |
| 2018/0182550 A1* | 6/2018 | Sasaki | H01G 4/232 |
| 2019/0157004 A1 | 5/2019 | Park et al. | |
| 2020/0029438 A1 | 1/2020 | Sasaki | |
| 2021/0280374 A1* | 9/2021 | Nishikawa | H05K 1/181 |
| 2023/0207207 A1* | 6/2023 | Choi | H01G 4/30 |
| | | | 361/301.4 |
| 2023/0420189 A1* | 12/2023 | Nishimura | H01G 4/012 |

FOREIGN PATENT DOCUMENTS

| | | |
|---|---|---|
| JP | 2003-243249 A | 8/2003 |
| JP | 2017005232 A | 1/2017 |
| JP | 2020017557 A | 1/2020 |
| KR | 20140071723 A | 6/2014 |
| KR | 20190059008 A | 5/2019 |

* cited by examiner

Primary Examiner — Michael P Mcfadden
(74) Attorney, Agent, or Firm — Keating & Bennett, LLP

(57) ABSTRACT

A multilayer ceramic electronic component includes a multilayer body and a pair of external electrodes at both ends of the multilayer body. The external electrodes include a main surface-side external electrode including a recess recessed towards a multilayer body side in a cross-sectional view along a lamination direction and a length direction of the multilayer body, and peripheral regions adjacent to the recess in the length direction. A surface roughness of the recess is rougher than a surface roughness of the peripheral regions.

19 Claims, 13 Drawing Sheets

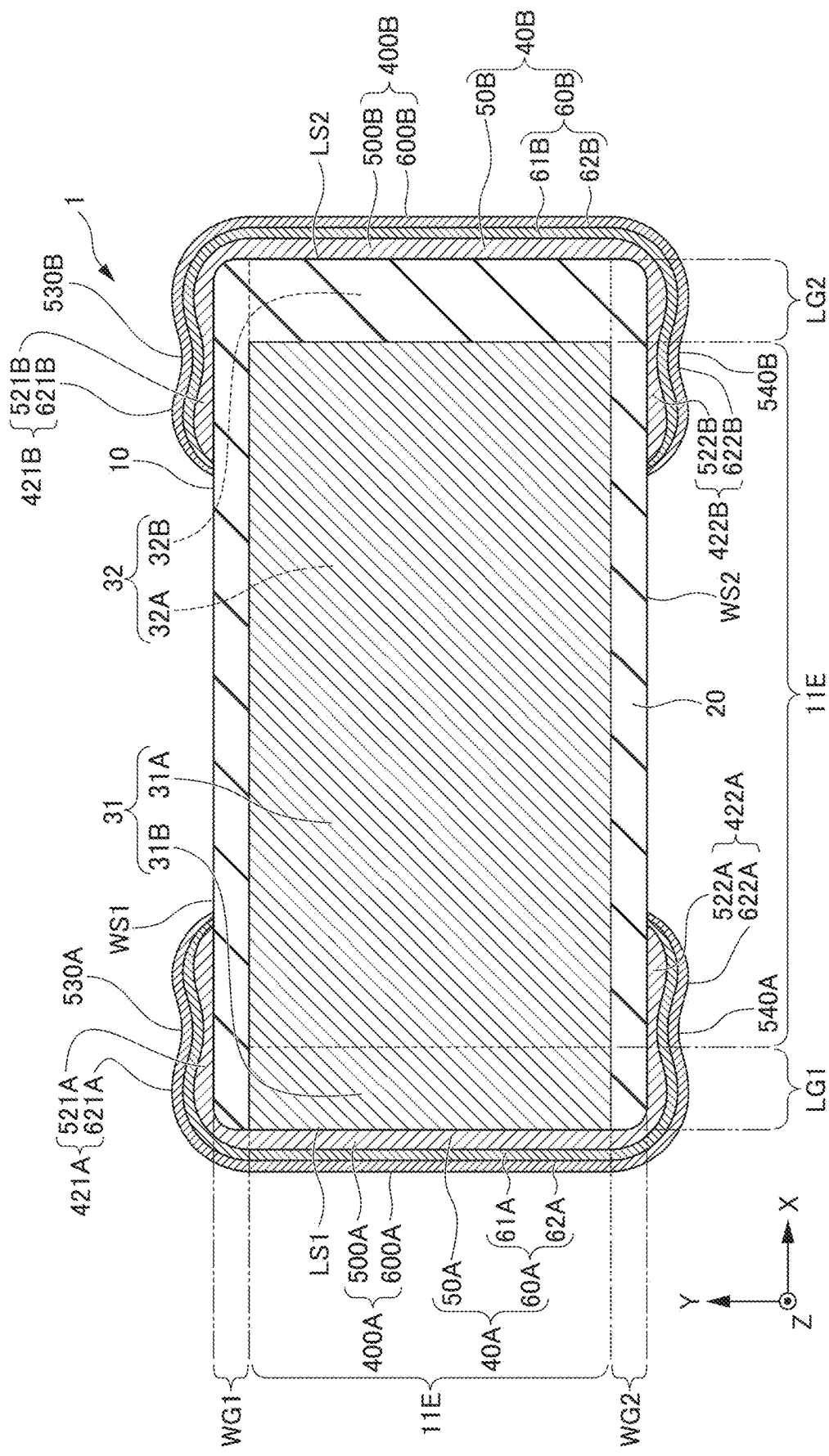

MULTILAYER CERAMIC ELECTRONIC COMPONENT

CROSS REFERENCE TO RELATED APPLICATIONS

This application is based on and claims the benefit of priority from Japanese Patent Application No. 2024-030487, filed on Feb. 29, 2024, the contents of which are incorporated herein by reference.

BACKGROUND OF THE INVENTION

1. Field of the Invention

The present invention relates to multilayer ceramic electronic components.

2. Description of the Related Art

Conventionally, multilayer ceramic capacitors as multilayer ceramic electronic components are known. In general, a multilayer ceramic capacitor includes a multilayer body, in which dielectric layers and internal electrode layers are alternately stacked, and external electrodes are provided on both end surfaces of the multilayer body. For example, Japanese Unexamined Patent Application, Publication No. 2003-243249 discloses a multilayer ceramic capacitor with the aforementioned structure, in which the external electrodes include a base electrode layer formed by firing.

In this type of multilayer ceramic capacitor, when mounted on a board, the bending stress occurring in the external electrodes is transmitted to the multilayer body, leading to concerns that cracks or the like may occur in the multilayer body. Therefore, there is a demand for a multilayer ceramic capacitor with improved flexural resistance.

SUMMARY OF THE INVENTION

Example embodiments of the present invention provide multilayer ceramic electronic components each with improved flexural resistance.

A multilayer ceramic electronic component according to an example embodiment of the present invention includes a multilayer body including a plurality of ceramic layers and a plurality of inner conductive layers stacked alternately in a lamination direction, first and second main surfaces on opposite sides in the lamination direction, first and second end surfaces on opposite sides in a length direction orthogonal or substantially orthogonal to the lamination direction, and first and second lateral surfaces on opposite sides in a width direction orthogonal or substantially orthogonal to both the lamination direction and the length direction, and a pair of external electrodes spaced apart from each other at both ends of the multilayer body in the length direction. The inner conductive layers include a first inner conductive layer extending to the first end surface, and a second inner conductive layer extending to the second end surface.

The external electrodes include a main surface-side external electrode on at least one of the first main surface or the second main surface. The main surface-side external electrode includes a recess recessed towards a multilayer body side in a cross-sectional view along the lamination direction and the length direction, and a peripheral region adjacent to the recess in the length direction. A surface roughness of the recess is rougher than a surface roughness of the peripheral region.

Example embodiments of the present invention provide multilayer ceramic electronic components each with improved flexural resistance.

The above and other elements, features, steps, characteristics s and advantages of the present invention will become more apparent from the following detailed description of the example embodiments with reference to the attached drawings.

BRIEF DESCRIPTION OF THE DRAWINGS

FIG. 4A is a cross-sectional view taken along the line IVA-IVA of FIG. 2.

DETAILED DESCRIPTION OF THE EXAMPLE EMBODIMENTS

Example embodiments of the present invention will be described in detail below with reference to the drawings.

Figure 1:
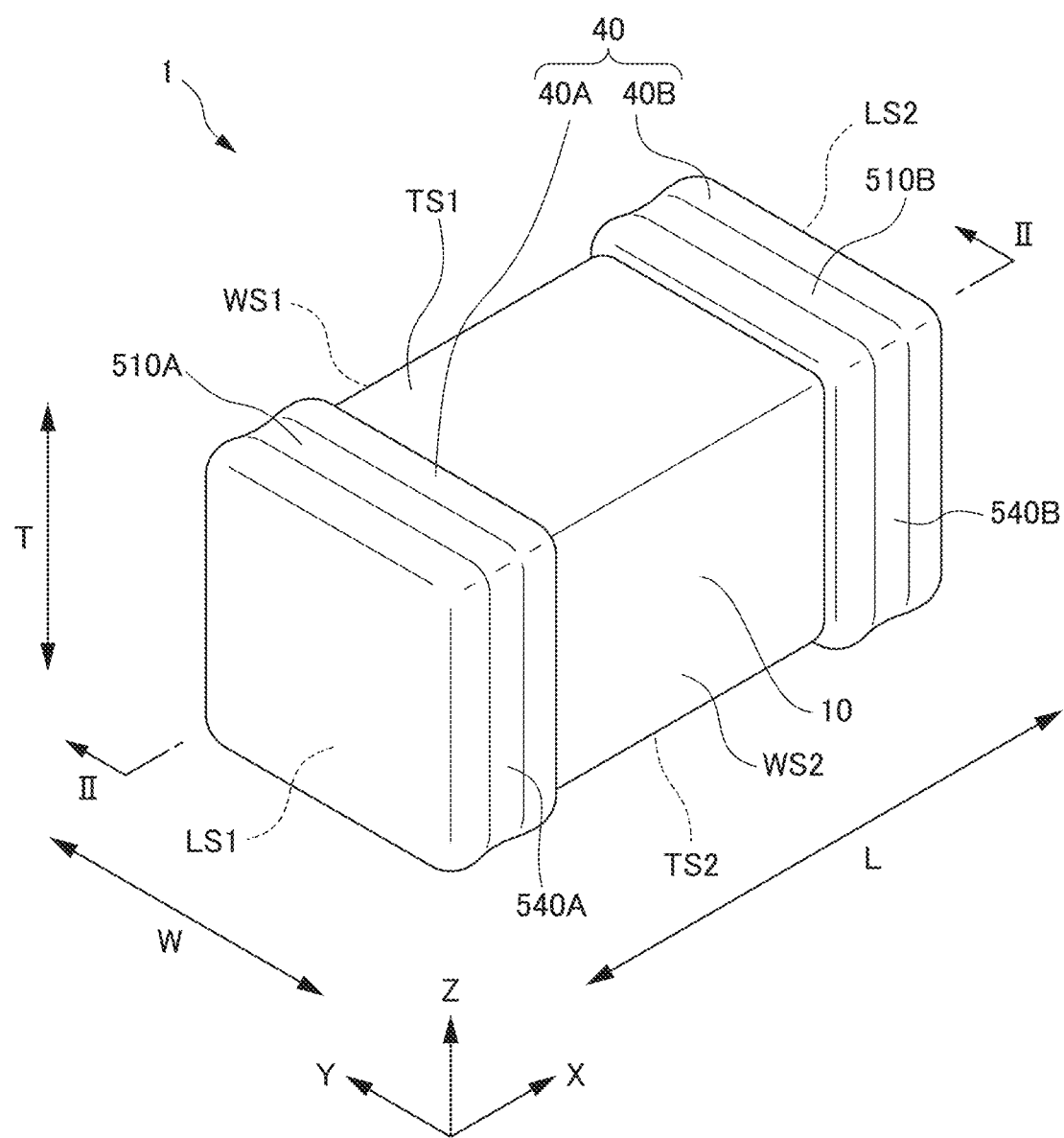
FIG. 1 is a perspective view of a multilayer ceramic capacitor according to an example embodiment of the present invention.
Figure 2:
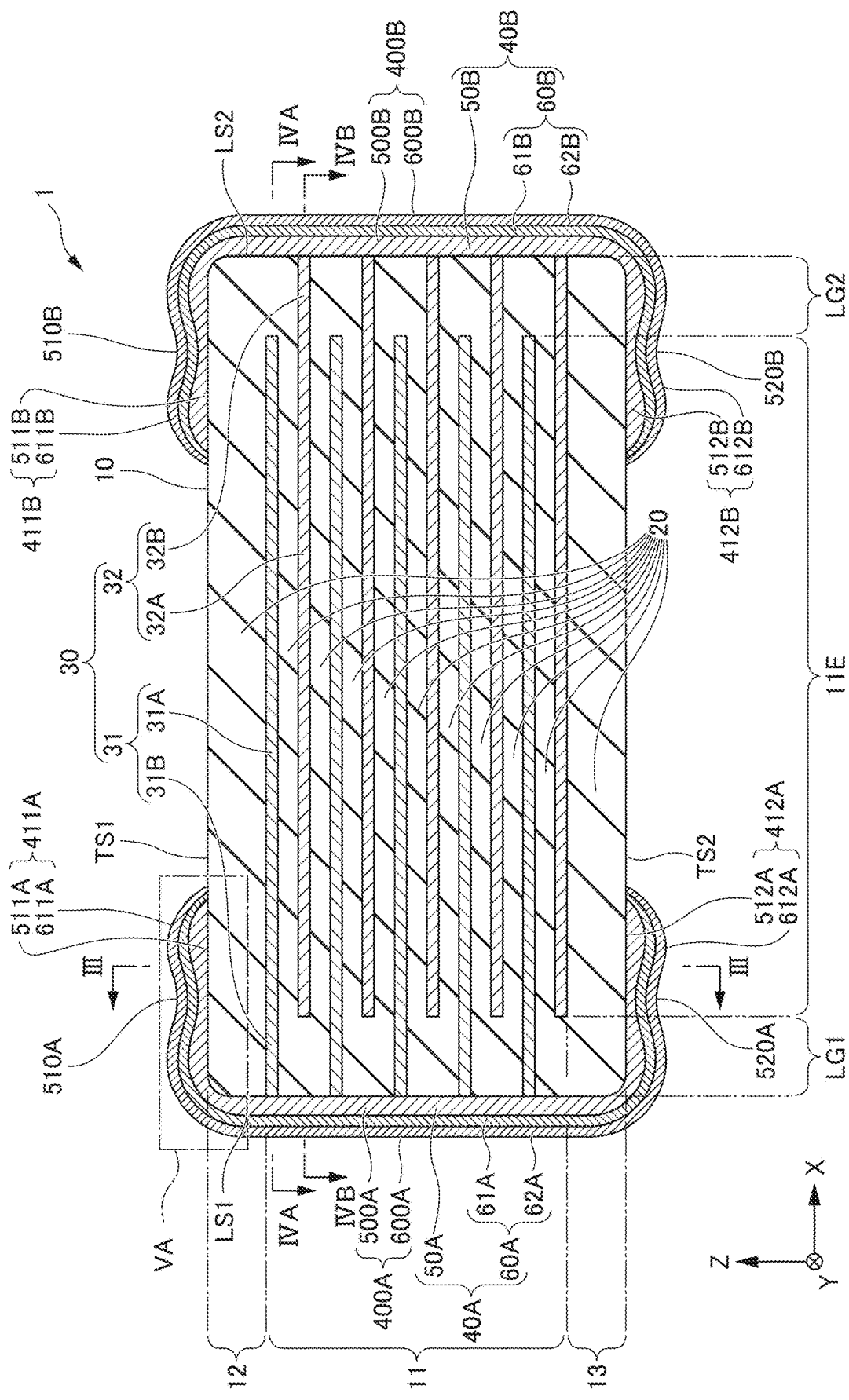
FIG. 2 is a cross-sectional view taken along the line II-II of FIG. 1.
Figure 3:
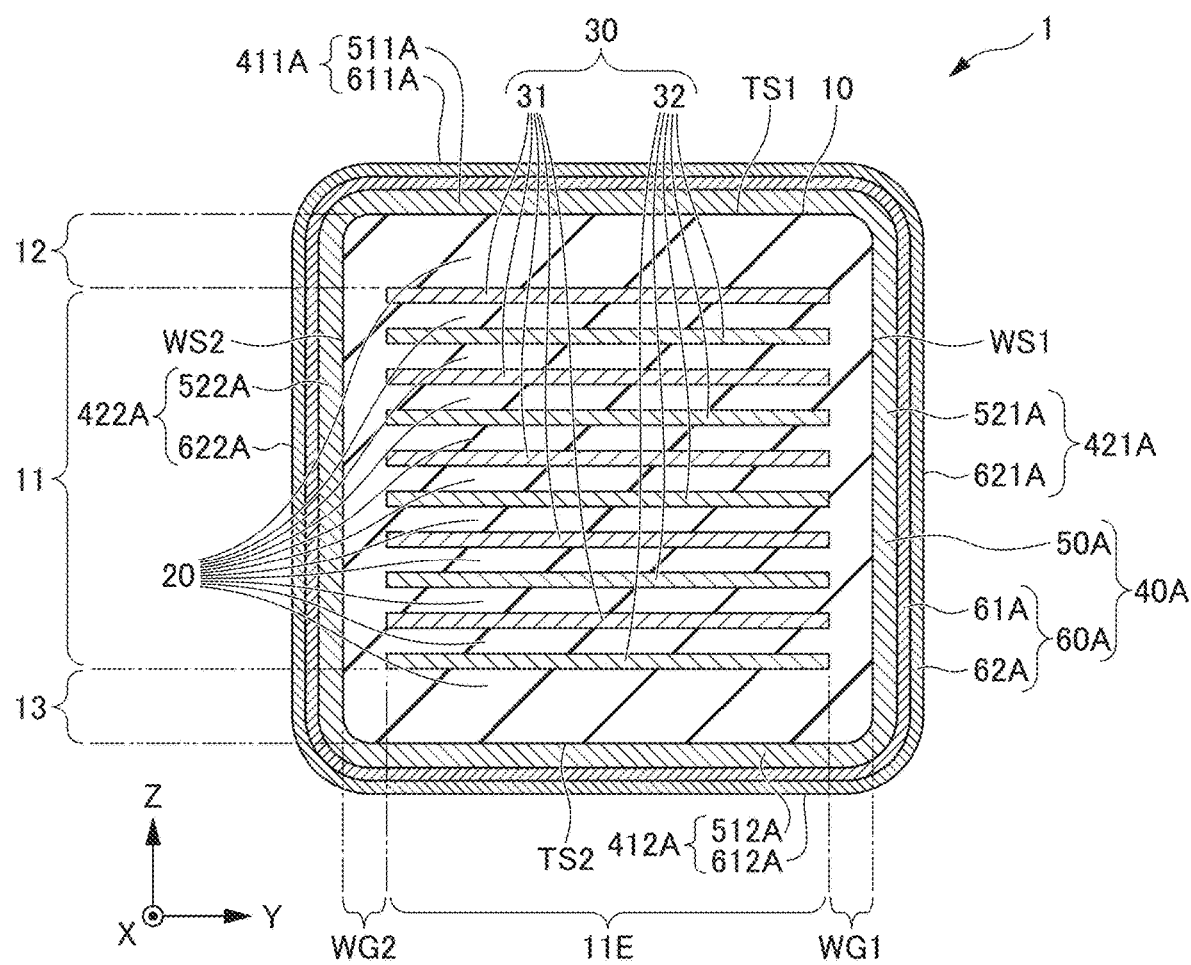
FIG. 3 is a cross-sectional view taken along the line III-III of FIG. 2.
Figure 4B:
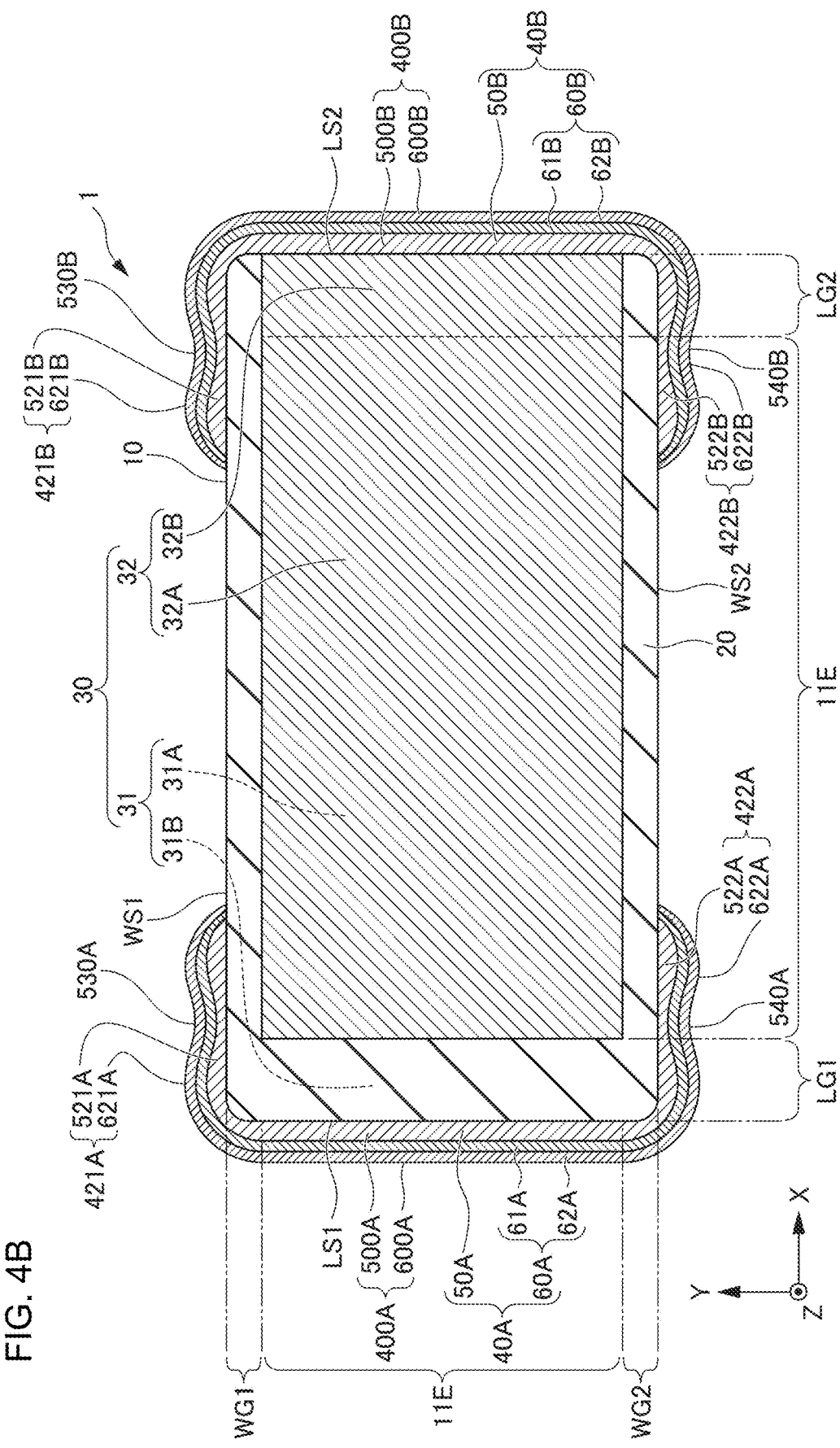
FIG. 4B is a cross-sectional view taken along the line IVB-IVB of FIG. 2.

A multilayer ceramic capacitor 1 as a multilayer ceramic electronic component according to an example embodiment of the present disclosure will be described with reference to the drawings. FIG. 1 is a perspective view of the multilayer ceramic capacitor 1 according to an example embodiment of the present invention. FIG. 2 is a cross-sectional view taken along the line II-II of FIG. 1. FIG. 3 is a cross-sectional view taken along the line III-III of FIG. 2. FIG. 4A is a cross-sectional view taken along the line IVA-IVA of FIG. 2. FIG. 4B is a cross-sectional view taken along the line IVB-IVB of FIG. 2.

As illustrated in FIG. 1, the multilayer ceramic capacitor 1 according to the present example embodiment has a rectangular or substantially rectangular parallelepiped shape. The multilayer ceramic capacitor 1 includes a multilayer body 10 having a rectangular or substantially rectangular parallelepiped shape, and a pair of external electrodes 40 spaced apart from each other at both ends of the multilayer body 10.

In FIG. 1, the arrow T indicates the lamination direction of the multilayer ceramic capacitor 1 and the multilayer body 10. The lamination direction T is also the thickness direction and the height direction of the multilayer ceramic capacitor 1 and the multilayer body 10. In FIG. 1, the arrow L indicates the length direction orthogonal or substantially orthogonal to the lamination direction T of the multilayer ceramic capacitor 1 and the multilayer body 10. In FIG. 1, the arrow W indicates the width direction orthogonal or substantially orthogonal to both the lamination direction T and the length direction L of the multilayer ceramic capacitor 1 and the multilayer body 10. The pair of external electrodes 40 are provided at ends of the multilayer body 10 in the length direction L, respectively.

FIGS. 1 to 4B illustrate an XYZ orthogonal coordinate system. The length direction L of the multilayer ceramic capacitor 1 and the multilayer body 10 corresponds to the X direction. The width direction W of the multilayer ceramic capacitor 1 and the multilayer body 10 corresponds to the Y direction. The lamination direction T of the multilayer ceramic capacitor 1 and the multilayer body 10 corresponds to the Z direction. The cross section illustrated in FIG. 2 is also referred to as an LT cross section. The cross section illustrated in FIG. 3 is also referred to as a WT cross section. The cross section illustrated in FIGS. 4A and 4B is also referred to as an LW cross section.

As illustrated in FIGS. 1 to 4B, the multilayer body 10 includes a first main surface TS1 and a second main surface TS2 on opposite sides in the lamination direction T, a first end surface LS1 and a second end surface LS2 on opposite sides in the length direction L orthogonal or substantially orthogonal to the lamination direction T, and a first lateral surface WS1 and a second lateral surface WS2 on opposite sides in the width direction W orthogonal or substantially orthogonal to both the lamination direction T and the length direction L.

As illustrated in FIG. 1, the multilayer body 10 has a rectangular or substantially rectangular parallelepiped shape. The dimension in the length direction L of the multilayer body 10 is not necessarily longer than the dimension in the width direction W. The corners and edges of the multilayer body 10 are preferably rounded. The corners are where three faces of the multilayer body intersect, and the edges are where two faces of the multilayer body intersect. The surfaces of the multilayer body 10 may include irregularities in an entirety or in a portion thereof.

The dimensions of the multilayer body 10 are not particularly limited. However, the dimension of the multilayer body 10 in the length direction L, denoted as the L dimension, is preferably, for example, between about 0.2 mm and about 10 mm inclusive. The dimension of the multilayer body 10 in the lamination direction T, denoted as the T dimension, is preferably, for example, between about 0.05 mm and about 10 mm inclusive. The dimension of the multilayer body 10 in the width direction W, denoted as the W dimension, is preferably, for example, between about 0.1 mm and about 10 mm inclusive.

As illustrated in FIGS. 2 and 3, the multilayer body 10 includes an inner layer portion 11, and a first main surface-side outer layer portion 12 and a second main surface-side outer layer portion 13 which sandwich the inner layer portion 11 in the lamination direction T.

The inner layer portion 11 includes a plurality of dielectric layers 20 as a plurality of ceramic layers, and a plurality of internal electrode layers 30 as a plurality of inner conductive layers, both of which are stacked alternately in the lamination direction T. The internal electrode layers 30 included in the inner layer portion 11 range from an internal electrode layer 30 closest to the first main surface TS1 to another internal electrode layer 30 closest to the second main surface TS2, in the lamination direction T. In the inner layer portion 11, the plurality of internal electrode layers 30 face each other via the dielectric layers 20. The inner layer portion 11 defines and functions to generate capacitance, and operates as a capacitor.

The dielectric layers 20 are made of dielectric materials. The dielectric materials may be dielectric ceramics containing components such as, for example, $BaTiO_3$, $CaTiO_3$, $SrTiO_3$, or $CaZrO_3$. In addition to these main components, the dielectric materials may include accessory components such as, for example, Mn compounds, Fe compounds, Cr compounds, Co compounds, or Ni compounds. The dielectric materials preferably include, for example, $BaTiO_3$ as the main component.

The thickness of the dielectric layers 20 is preferably, for example, between about 0.2 μm and about 15 μm inclusive. The number of dielectric layers 20 to be stacked (laminated) is preferably, for example, between 10 and 1200 inclusive. The number of dielectric layers 20 is the total of the number of dielectric layers 20 in the inner layer portion 11, and the number of the dielectric layers 20 in the first main surface-side outer layer portion 12 and the second main surface-side outer layer portion 13.

The plurality of internal electrode layers 30 include a plurality of first internal electrode layers 31 as a plurality of first inner conductive layers, and a plurality of second internal electrode layers 32 as a plurality of second inner conductive layers. The first internal electrode layers 31 and the second internal electrode layers 32 are alternately provided in the lamination direction T with the dielectric layers 20 interposed therebetween. The first internal electrode layers 31 extend to the first end surface LS1. The second internal electrode layers 32 extend to the second end surface LS2. Hereinafter, when there is no need to distinguish between the first internal electrode layers 31 and the second internal electrode layers 32 for description, the first internal electrode layers 31 and the second internal electrode layers 32 may collectively be referred to as the internal electrode layers 30.

As illustrated in FIG. 4A, the first internal electrode layer 31 includes a first counter portion 31A and a first extension portion 31B. The first counter portion 31A is a region facing the second internal electrode layer 32 across the dielectric layer 20 and is provided inside the multilayer body 10. The first extension portion 31B is a portion extending from the first counter portion 31A to the first end surface LS1 and exposed at the first end surface LS1.

As illustrated in FIG. 4B, the second internal electrode layer 32 includes a second counter portion 32A and a second extension portion 32B. The second counter portion 32A is a region facing the first internal electrode layer 31 across the dielectric layer 20 and is provided inside the multilayer body 10. The second extension portion 32B is a portion extending from the second counter portion 32A to the second end surface LS2 and exposed at the second end surface LS2.

In the present example embodiment, the first counter portion 31A and the second counter portion 32A face each other across the dielectric layer 20, so as to generate a capacitance and provide the characteristics of the capacitor.

The shapes of the first counter portion 31A and the second counter portion 32A are not particularly limited but are preferably rectangular or substantially rectangular. However, the corners of the rectangular-shaped portions may be rounded or extend diagonally. The shapes of the first extension portion 31B and the second extension portion 32B are not particularly limited but are preferably rectangular or substantially rectangular. However, the corners of the rectangular-shaped portions may be rounded or extend diagonally.

Both of the dimensions of the first counter portion 31A and the first extension portion 31B in the width direction W may be the same or substantially the same, or one of the dimensions may be smaller. Both of the dimensions of the second counter portion 32A and the second extension portion 32B in the width direction W may be the same or substantially the same, or one of the dimensions may be smaller.

The first internal electrode layers 31 and the second internal electrode layers 32 are made of appropriate conductive materials such as, for example, metals like Ni, Cu, Ag, Pd, Au, or alloys including at least one of these metals. When using an alloy, for example, the first internal electrode layers 31 and the second internal electrode layers 32 may be made of Ag—Pd alloy, for example.

The thickness of the first internal electrode layers 31 and the second internal electrode layers 32 is preferably, for example, between about 0.2 μm and about 2.0 μm inclusive. The total number of the first internal electrode layers 31 and the second internal electrode layers 32 is preferably, for example, between 10 and 1000 inclusive.

As illustrated in FIGS. 2 and 3, the first main surface-side outer layer portion 12 is provided to the first main surface TS1 side of the multilayer body 10. The first main surface-side outer layer portion 12 is a collective portion including the plurality of dielectric layers 20 between the first main surface TS1 and the internal electrode layer 30 closest to the first main surface TS1. On the other hand, the second main surface-side outer layer portion 13 is provided to the second main surface TS2 side of the multilayer body 10. The second main surface-side outer layer portion 13 is a collective portion including the plurality of dielectric layers 20 between the second main surface TS2 and the internal electrode layer 30 closest to the second main surface TS2. The dielectric layers 20 used for the first main surface-side outer layer portion 12 and the second main surface-side outer layer portion 13 may be the same as the dielectric layers 20 used for the inner layer portion 11.

The multilayer body 10 includes a counter electrode portion 11E. The counter electrode portion 11E is a portion where the first counter portion 31A of the first internal electrode layer 31 faces the second counter portion 32A of the second internal electrode layer 32. The counter electrode portion 11E is a portion of the inner layer portion 11. FIGS. 4A and 4B illustrate the range of the counter electrode portion 11E in the width direction W and the length direction L. The counter electrode portion 11E is also referred to as the capacitor active portion.

The multilayer body 10 includes lateral surface-side outer layer portions. The lateral surface-side outer layer portions include a first lateral surface-side outer layer portion WG1 and a second lateral surface-side outer layer portion WG2. The first lateral surface-side outer layer portion WG1 is a portion including the dielectric layers 20 between the counter electrode portion 11E and the first lateral surface WS1. The second lateral surface-side outer layer portion WG2 is a portion including the dielectric layers 20 between the counter electrode portion 11E and the second lateral surface WS2. FIGS. 3, 4A, and 4B illustrate the range of the first lateral surface-side outer layer portion WG1 and the second lateral surface-side outer layer portion WG2 in the width direction W. The lateral surface-side outer layer portions are also referred to as a W-gap or side gap.

The multilayer body 10 includes end surface-side outer layer portions. The end surface-side outer layer portions include a first end surface-side outer layer portion LG1 and a second end surface-side outer layer portion LG2. The first end surface-side outer layer portion LG1 is a portion including the dielectric layers 20 and the first extension portion 31B between the counter electrode portion 11E and the first end surface LS1. In other words, the first end surface-side outer layer portion LG1 is a collective portion including a portion of the plurality of dielectric layers 20 on the first end surface LS1 side and the plurality of first extension portions 31B. Similarly, the second end surface-side outer layer portion LG2 is a portion including the dielectric layers 20 and the second extension portion 32B between the counter electrode portion 11E and the second end surface LS2. In other words, the second end surface-side outer layer portion LG2 is a collective portion including a portion of the plurality of dielectric layers 20 on the second end surface LS2 side and the plurality of second extension portions 32B. FIGS. 2, 4A, and 4B illustrate the range of the first end surface-side outer layer portion LG1 and the second end surface-side outer layer portion LG2 in the length direction L. The end surface-side outer layer portions are also referred to as an L-gap or end gap.

As illustrated in FIGS. 1 and 2, the external electrodes 40 include a first external electrode 40A provided to the first end surface LS1 side of the multilayer body 10, and a second external electrode 40B provided to the second end surface LS2 side of the multilayer body 10.

The basic structure of the first external electrode 40A and the second external electrode 40B is the same or substantially the same. The shape of the first external electrode 40A and the second external electrode 40B is plane-symmetrical or substantially plane-symmetrical with respect to the WT cross section at the center in the length direction L of the multilayer ceramic capacitor 1. Therefore, when there is no need to distinguish between the first external electrode 40A and the second external electrode 40B for description, the first external electrode 40A and the second external electrode 40B may be collectively referred to as the external electrodes 40.

The first external electrode 40A is provided on the first end surface LS1. The first external electrode 40A is in contact with the first extension portions 31B of the plurality of first internal electrode layers 31 exposed at the first end surface LS1. Consequently, the first external electrode 40A is electrically connected to the plurality of first internal electrode layers 31. The first external electrode 40A may also be provided on a portion of the first main surface TS1, a portion of the second main surface TS2, a portion of the first lateral surface WS1, and a portion of the second lateral surface WS2. In the present example embodiment, the first external electrode 40A extends from the first end surface LS1 to a portion of the first main surface TS1, a portion of the second main surface TS2, a portion of the first lateral surface WS1, and a portion of the second lateral surface WS2.

The second external electrode 40B is provided on the second end surface LS2. The second external electrode 40B is in contact with each of the second extension portions 32B of the plurality of second internal electrode layers 32 exposed at the second end surface LS2. Consequently, the second external electrode 40B is electrically connected to the plurality of second internal electrode layers 32. The second external electrode 40B may be provided on a portion of the first main surface TS1, a portion of the second main surface TS2, a portion of the first lateral surface WS1, and a portion of the second lateral surface WS2. In the present example embodiment, the second external electrode 40B extends from the second end surface LS2 to a portion of the first main surface TS1, a portion of the second main surface TS2, a portion of the first lateral surface WS1, and a portion of the second lateral surface WS2.

As described above, within the multilayer body 10, the first counter portion 31A of the first internal electrode layer 31 faces the second counter portion 32A of the second internal electrode layer 32 via the dielectric layer 20, so as to generate capacitance. Therefore, capacitor characteristics a provided between the first external electrode 40A connected to the first internal electrode layer 31 and the second external electrode 40B connected to the second internal electrode layer 32.

As illustrated in FIGS. 2, 4A, and 4B, the first external electrode 40A includes a first base electrode layer 50A and a first plated layer 60A provided on the first base electrode layer 50A. The second external electrode 40B includes a second base electrode layer 50B and a second plated layer 60B provided on the second base electrode layer 50B.

The first base electrode layer 50A is provided on the first end surface LS1. The first base electrode layer 50A is connected to the first extension portions 31B of the plurality of first internal electrode layers 31 exposed at the first end surface LS1. In the present example embodiment, the first base electrode layer 50A extends from the first end surface LS1 to a portion of the first main surface TS1, a portion of the second main surface TS2, a portion of the first lateral surface WS1, and a portion of the second lateral surface WS2.

The second base electrode layer 50B is provided on the second end surface LS2. The second base electrode layer 50B is in contact with the second extension portions 32B of the plurality of second internal electrode layers 32 exposed at the second end surface LS2. In the present example embodiment, the second base electrode layer 50B extends from the second end surface LS2 to a portion of the first main surface TS1, a portion of the second main surface TS2, a portion of the first lateral surface WS1, and a portion of the second lateral surface WS2.

The first base electrode layer 50A and the second base electrode layer 50B of the present example embodiment are fired layers. The fired layer preferably include, for example, a metal component and either a glass component or a ceramic component, or both. The metal component may include, for example, at least one of Cu, Ni, Ag, Pd, Ag—Pd alloy, or Au. The glass component may include, for example, at least one of B, Si, Ba, Mg, Al, or Li. The ceramic component may use the same ceramic material as the dielectric layer 20 or a different type of ceramic material. Examples of the ceramic component include, for example, at least one of $BaTiO_3$, $CaTiO_3$, $(Ba,Ca)TiO_3$, $SrTiO_3$, or $CaZrO_3$.

The fired layer is formed by applying a conductive paste including glass and metal to the multilayer body 10 followed by firing. The fired layer can be formed by simultaneously firing a pre-firing multilayer chip, which is a material of the multilayer body 10 including a plurality of internal electrodes and dielectric layers, and the conductive paste applied to the multilayer chip. Alternatively, the fired layer can be formed by obtaining the multilayer body 10 by firing the multilayer chip and then applying the conductive paste to the multilayer body 10 followed by firing. In the case as described above, the fired layer is preferably formed by firing a mixture including ceramic material instead of a glass component. In this case, as the ceramic material to be added, using a ceramic material the same as or similar to the dielectric layer 20 is preferable. The fired layer may include a plurality of layers.

The thickness of the first base electrode layer 50A provided on the first end surface LS1 in the length direction L is, for example, preferably between about 2 μm and about 220 μm inclusive at the center of the first base electrode layer 50A in the lamination direction T and the width direction W.

The thickness of the second base electrode layer 50B provided on the second end surface LS2 in the length direction L is, for example, preferably between about 2 μm and about 220 μm inclusive at the center of the second base electrode layer 50B in the lamination direction T and the width direction W.

In cases where the first base electrode layer 50A is also provided on a portion of at least one of the first main surface TS1 or the second main surface TS2, the thickness of the first base electrode layer 50A provided in this portion in the lamination direction T is, for example, preferably between about 3 μm and about 40 μm inclusive at the center of the first base electrode layer 50A provided in this portion in the length direction L and the width direction W.

In cases where the first base electrode layer 50A is also provided on a portion of at least one of the first lateral surface WS1 or the second lateral surface WS2, the thickness of the first base electrode layer 50A provided in this portion in the width direction W is, for example, preferably between about 3 μm and about 40 μm inclusive at the center of the first base electrode layer 50A provided in this portion in the length direction L and the lamination direction T.

In cases where the second base electrode layer 50B is also provided on a portion of at least one of the first main surface TS1 or the second main surface TS2, the thickness of the second base electrode layer 50B provided in this portion in the lamination direction T is, for example, preferably between about 3 μm and about 40 μm inclusive at the center of the second base electrode layer 50B provided in this portion in the length direction L and the width direction W.

In cases where the second base electrode layer 50B is also provided on a portion of at least one of the first lateral surface WS1 or the second lateral surface WS2, the thickness of the second base electrode layer 50B provided in this portion in the width direction W is, for example, preferably between about 3 μm and about 40 μm inclusive at the center of the second base electrode layer 50B provided in this portion in the length direction L and the lamination direction T.

The first plated layer 60A is provided to cover the first base electrode layer 50A.

The second plated layer 60B is provided to cover the second base electrode layer 50B.

The first plated layer 60A and the second plated layer 60B may include at least one of, for example, Cu, Ni, Sn, Ag, Pd, Ag—Pd alloy, or Au. The first plated layer 60A and the second plated layer 60B may include a plurality of layers. The first plated layer 60A and the second plated layer 60B preferably have a two-portion structure including, for example, a Sn plated layer on top of a Ni plated layer.

The first plated layer 60A is provided to cover the first base electrode layer 50A. In the present example embodiment, the first plated layer 60A includes, for example, a first Ni plated layer 61A and a first Sn plated layer 62A provided on the first Ni plated layer 61A.

The second plated layer 60B is provided to cover the second base electrode layer 50B.

In the present example embodiment, the second plated layer 60B includes, for example, a second Ni plated layer 61B and a second Sn plated layer 62B provided on the second Ni plated layer 61B.

The Ni plated layer prevents the first base electrode layer 50A and the second base electrode layer 50B from being eroded by solder when mounting the multilayer ceramic capacitor 1. The Sn plated layer improves the wettability of solder when mounting the multilayer ceramic capacitor 1. As a result, the multilayer ceramic capacitor 1 can be easily mounted. The thickness of the first Ni plated layer 61A, the first Sn plated layer 62A, the second Ni plated layer 61B, and the second Sn plated layer 62B is, for example, preferably between about 1 μm and about 15 μm inclusive.

The external electrode 40 of example embodiment may include an electrically conductive resin layer including electrically conductive particles and a thermosetting resin, for example. The electrically conductive resin layer may cover the fired layer. When the electrically conductive resin layer covers the fired layer, the electrically conductive resin layer is provided between the fired layer and the plated layers (the first plated layer 60A and the second plated layer 60B). The electrically conductive resin layer may completely cover the fired layer or may partially cover the fired layer.

The electrically conductive resin layer including a thermosetting resin is more flexible than an electrically conductive layer made of, for example, a plated film or a fired product of an electrically conductive paste. Therefore, even when an impact caused by physical shock or thermal cycle is applied to the multilayer ceramic capacitor 1, the electrically conductive resin layer defines and functions as a buffer layer. Therefore, the electrically conductive resin layer reduces or prevents the occurrence of cracking in the multilayer ceramic capacitor 1.

Metals of the electrically conductive particles may be, for example, Ag, Cu, Ni, Sn, Bi or alloys thereof. The electrically conductive particle preferably includes Ag, for example. The electrically conductive particle is a metal powder of Ag, for example. Ag is suitable as an electrode material because of its lowest resistivity among metals. In addition, since Ag is a noble metal, it is not likely to be oxidized, and weatherability thereof is high. Therefore, for example, the metal powder of Ag is suitable as the electrically conductive particle.

Furthermore, the electrically conductive particle may be, for example, a metal powder coated on the surface of the metal powder with Ag. When using those coated with Ag on the surface of the metal powder, the metal powder is preferably, for example, Cu, Ni, Sn, Bi, or an alloy powder thereof. In order to make the metal of the base material inexpensive while keeping the characteristics of Ag, it is preferable to use a metal powder coated with Ag, for example.

Furthermore, the electrically conductive particle may be formed by subjecting Cu and Ni to an oxidation prevention treatment. Furthermore, the electrically conductive particle may be, for example, a metal powder coated with Sn, Ni, and Cu on the surface of the metal powder. When using those coated with Sn, Ni, and Cu on the surface of the metal powder, the metal powder is preferably, for example, Ag, Cu, Ni, Sn, Bi, or an alloy powder thereof.

The shape of the electrically conductive particle is not particularly limited. For the electrically conductive particle, a spherical metal powder, a flat metal powder, or the like can be used. However, it is preferable to use a mixture of a spherical metal powder and a flat metal powder.

The electrically conductive particles included in the electrically conductive resin layer mainly ensure the conductivity of the electrically conductive resin layer. Specifically, by a plurality of electrically conductive particles being in contact with each other, an energization path is provided inside the electrically conductive resin layer.

The resin of the electrically conductive resin layer may include, for example, at least one of a variety of known thermosetting resins such as epoxy resin, phenolic resin, urethane resin, silicone resin, polyimide resin, and the like. Among those, epoxy resin is excellent in heat resistance, moisture resistance, adhesion, etc., and thus is one of the more preferable resins. Furthermore, it is preferable that the resin of the electrically conductive resin layer includes a curing agent together with a thermosetting resin. When epoxy resin is used as a base resin, the curing agent for the epoxy resin may be various known compounds such as, for example, phenols, amines, acid anhydrides, imidazoles, active esters, and amide-imides.

The electrically conductive resin layer may include a plurality of layers. The thickest portion of the electrically conductive resin layer is preferably, for example, about 10 μm or more and about 150 μm or less.

The basic configuration of the multilayer ceramic capacitor 1 according to the present example embodiment has been described above. The dimension of the multilayer ceramic capacitor 1 including the multilayer body 10 and the external electrodes 40 in the length direction, denoted as the L dimension, is preferably, for example, between about 0.2 mm and about 10 mm inclusive. The dimension of the multilayer ceramic capacitor 1 in the lamination direction, denoted as the T dimension, is preferably, for example, between about 0.05 mm and about 10 mm inclusive. The dimension of the multilayer ceramic capacitor 1 in the width direction, denoted as the W dimension, is preferably, for example, between about 0.1 mm and about 10 mm inclusive.

The multilayer ceramic capacitor 1 of the present example embodiment: including the basic configuration has the following characteristics in the external electrodes 40, which is the first external electrode 40A and the second external electrode 40B.

The external electrodes 40 of the present example embodiment include the main surface-side external electrodes provided on at least one of the first main surface TS1 or the second main surface TS2. Specifically, as described above, the first external electrode 40A of the present example embodiment is provided on the first end surface LS1 and extends from the first end surface LS1 to a portion of the first main surface TS1, a portion of the second main surface TS2, a portion of the first lateral surface WS1, and a portion of the second lateral surface WS2. The first external electrode 40A of the present example embodiment includes a first end surface-side external electrode 400A as an end surface-side external electrode provided on the first end surface LS1, a first main surface-side external electrode 411A as a main surface-side external electrode provided on the first main surface TS1, a second main surface-side external electrode 412A as a main surface-side external electrode provided on the second main surface TS2, as illustrated in FIG. 2, a first lateral surface-side external electrode 421A provided on the first lateral surface WS1, and a second lateral surface-side external electrode 422A provided on the second lateral surface WS2, as illustrated in FIGS. 4A and 4B.

As described above, the first external electrode 40A includes the first base electrode layer 50A and the first plated layer 60A provided on the first base electrode layer 50A. In the present example embodiment, the first base electrode layer 50A extends from the first end surface LS1 to a portion of the first main surface TS1, a portion of the second main surface TS2, a portion of the first lateral surface WS1, and a portion of the second lateral surface WS2, in which the first plated layer 60A is provided to cover the first base electrode layer 50A.

Specifically, as illustrated in FIG. 2, the first end surface-side external electrode 400A of the present example embodiment includes a first end surface-side base electrode layer 500A provided on the first end surface LS1, and a first end surface-side plated layer 600A provided above the first end surface-side base electrode layer 500A. The first end surface-side base electrode layer 500A is a portion of the first base electrode layer 50A. The first end surface-side plated layer 600A is a portion of the first plated layer 60A, and includes the first Ni plated layer 61A and the first Sn plated layer 62A provided on the first Ni plated layer 61A.

As illustrated in FIG. 2, the first main surface-side external electrode 411A of the present example embodiment includes a first main surface-side base electrode layer 511A as a main surface-side base electrode layer provided on the first main surface TS1, and a first main surface-side plated layer 611A as a main surface-side plated layer provided above the first main surface-side base electrode layer 511A. The first main surface-side base electrode layer 511A is a portion of the first base electrode layer 50A. The first main surface-side plated layer 611A is a portion of the first plated layer 60A, and includes the first Ni plated layer 61A and the first Sn plated layer 62A provided on the first Ni plated layer 61A.

As illustrated in FIG. 2, the second main surface-side external electrode 412A of the present example embodiment includes a second main surface-side base electrode layer 512A as a main surface-side base electrode layer provided on the second main surface TS2, and a second main surface-side plated layer 612A as a main surface-side plated layer provided above the second main surface-side base electrode layer 512A. The second main surface-side base electrode layer 512A is a portion of the first base electrode layer 50A. The second main surface-side plated layer 612A is a portion of the first plated layer 60A, and includes the first Ni plated layer 61A and the first Sn plated layer 62A provided on the first Ni plated layer 61A.

As illustrated in FIGS. 4A and 4B, the first lateral surface-side external electrode 421A of the present example embodiment includes a first lateral surface-side base electrode layer 521A provided on the first lateral surface WS1, and a first lateral surface-side plated layer 621A provided above the first lateral surface-side base electrode layer 521A. The first lateral surface-side base electrode layer 521A is a portion of the first base electrode layer 50A. The first lateral surface-side plated layer 621A is a portion of the first plated layer 60A, and includes the first Ni plated layer 61A and the first Sn plated layer 62A provided on the first Ni plated layer 61A.

As illustrated in FIGS. 4A and 4B, the second lateral surface-side external electrode 422A of the present example embodiment includes a second lateral surface-side base electrode layer 522A provided on the second lateral surface WS2, and a second lateral surface-side plated layer 622A provided above the second lateral surface-side base electrode layer 522A. The second lateral surface-side base electrode layer 522A is a portion of the first base electrode layer 50A. The second lateral surface-side plated layer 622A is a portion of the first plated layer 60A, and includes the first Ni plated layer 61A and the first Sn plated layer 62A provided on the first Ni plated layer 61A.

The thickness of the first Ni plated layer 61A and the first Sn plated layer 62A of the first main surface-side plated layer 611A, the second main surface-side plated layer 612A, the first lateral surface-side plated layer 621A, and the second lateral surface-side plated layer 622A is preferably, for example, between about 1 µm and about 4 µm inclusive.

As described above, the second external electrode 40B of the present example embodiment is provided on the second end surface LS2 and extends from the second end surface LS2 to a portion of the first main surface TS1, a portion of the second main surface TS2, a portion of the first lateral surface WS1, and a portion of the second lateral surface WS2. Specifically, the second external electrode 40B of the present example embodiment includes a second end surface-side external electrode 400B as an end surface-side external electrode provided on the second end surface LS1, a first main surface-side external electrode 411B provided as a main surface-side external electrode on the first main surface TS1, a second main surface-side external electrode 412B as a main surface-side external electrode provided on the second main surface TS2, as illustrated in FIG. 2, a first lateral surface-side external electrode 421B provided on the first lateral surface WS1, and a second lateral surface-side external electrode 422B provided on the second lateral surface WS2, as illustrated in FIGS. 4A and 4B.

As described above, the second external electrode 40B includes the second base electrode layer 50B and the second plated layer 60B provided on the second base electrode layer 50B. In the present example embodiment, the second base electrode layer 50B extends from the second end surface LS2 to a portion of the first main surface TS1, a portion of the second main surface TS2, a portion of the first lateral surface WS1, and a portion of the second lateral surface WS2, in which the second plated layer 60B is provided to cover the second base electrode layer 50B.

Specifically, as illustrated in FIG. 2, the second end surface-side external electrode 400B of the present example embodiment includes a second end surface-side base electrode layer 500B provided on the second end surface LS2, and a second end surface-side plated layer 600B provided above the second end surface-side base electrode layer 500B. The second end surface-side base electrode layer 500B is a portion of the second base electrode layer 50B. The second end surface-side plated layer 600B is a portion of the second plated layer 60B, and includes the second Ni plated layer 61B and the second Sn plated layer 62B provided on the second Ni plated layer 61B.

As illustrated in FIG. 2, the first main surface-side external electrode 411B of the present example embodiment includes the first main surface-side base electrode layer 511B as a main surface-side base electrode layer provided on the first main surface TS1, and the first main surface-side plated layer 611B as a main surface-side plated layer provided above the first main surface-side base electrode layer 511B. The first main surface-side base electrode layer 511B is a portion of the second base electrode layer 50B. The first main surface-side plated layer 611B is a portion of the second plated layer 60B, and includes the second Ni plated layer 61B and the second Sn plated layer 62B provided on the second Ni plated layer 61B.

As illustrated in FIG. 2, the second main surface-side external electrode 412B of the present example embodiment includes the second main surface-side base electrode layer 512B as a main surface-side base electrode layer provided on the second main surface TS2, and the second main surface-side plated layer 612B as a main surface-side plated layer provided above the second main surface-side base electrode layer 512B. The second main surface-side base electrode layer 512B is a portion of the second base electrode layer 50B. The second main surface-side plated layer 612B is a portion of the second plated layer 60B, and includes the second Ni plated layer 61B and the second Sn plated layer 62B provided on the second Ni plated layer 61B.

As illustrated in FIGS. 4A and 4B, the first lateral surface-side external electrode 421B of the present example embodiment includes the first lateral surface-side base electrode layer 521B provided on the first lateral surface WS1 and the first lateral surface-side plated layer 621B provided above the first lateral surface-side base electrode layer 521B. The first lateral surface-side base electrode layer 621B is a portion of the second base electrode layer 50B. The first lateral surface-side plated layer 621B is a portion of the second plated layer 60B, and includes the second Ni plated layer 61B and the second Sn plated layer 62B provided on the second Ni plated layer 61B.

As illustrated in FIGS. 4A and 4B, the second lateral surface-side external electrode 422B of the present example embodiment includes the second lateral surface-side base electrode layer 522B provided on the second lateral surface WS2 and the second lateral surface-side plated layer 622B provided above the second lateral surface-side base electrode layer 522B. The second lateral surface-side base electrode layer 522B is a portion of the second base electrode layer 50B. The second lateral surface-side plated layer 622B is a portion of the second plated layer 60B, and includes the second Ni plated layer 61B and the second Sn plated layer 62B provided on the second Ni plated layer 61B.

The thickness of the second Ni plated layer 61B and the second Sn plated layer 62B of the first main surface-side plated layer 611B, the second main surface-side plated layer 612B, the first lateral surface-side plated layer 621B, and the second lateral surface-side plated layer 622B is preferably, for example, between about 1 μm and about 4 μm inclusive.

FIG. 2 illustrates the LT cross-sectional view of the multilayer ceramic capacitor 1 and the multilayer body 10 along the lamination direction T and the length direction L. In the LT cross-sectional view, the first main surface-side external electrode 411A of the first external electrode 40A includes a first main surface-side recess 510A as a recess recessed towards the multilayer body 10 side. The first main surface-side recess 510A is provided on the surface of the first main surface-side external electrode 411A. The shape of the first main surface-side recess 510A is a groove extending in the width direction W orthogonal or substantially orthogonal to the LT cross-section, i.e., in the direction perpendicular to the paper surface of FIG. 2. The first main surface-side recess 510A may be provided over the entire or substantially the entire length of the first main surface-side external electrode 411A along the width direction W. The first main surface-side recess 510A is provided in or adjacent to the approximate center of the first main surface-side external electrode 411A in the length direction L.

As illustrated in FIG. 2, the second main surface-side external electrode 412A of the first external electrode 40A includes a second main surface-side recess 520A as a recess recessed towards the multilayer body 10 side in the LT cross-sectional view. The second main surface-side recess 520A is provided on the surface of the second main surface-side external electrode 412A. The shape of the second main surface-side recess 520A is a groove extending in the width direction W orthogonal or substantially orthogonal to the LT cross-section, i.e., in the direction perpendicular or substantially perpendicular to the paper surface of FIG. 2. The second main surface-side recess 520A may be provided over the entire or substantially the entire length of the second main surface-side external electrode 412A along the width direction W. The second main surface-side recess 520A is provided in or adjacent to the approximate center of the second main surface-side external electrode 412A in the length direction L.

As illustrated in FIG. 2, the first main surface-side external 411B of the second external electrode 40B includes a first main surface-side recess 510B as a recess recessed towards the multilayer body 10 side in the LT cross-sectional view. The first main surface-side recess 510B is provided on the surface of the first main surface-side external electrode 411B. The shape of the first main surface-side recess 510B is a groove extending in the width direction W orthogonal or substantially orthogonal to the LT cross-section, i.e., in the direction perpendicular or substantially perpendicular to the paper surface of FIG. 2. The first main surface-side recess 510B may be provided over the entire or substantially the entire length of the first main surface-side external electrode 411B along the width direction W. The first main surface-side recess 510B is provided in or adjacent to the approximate center of the first main surface-side external electrode 411B in the length direction L.

As illustrated in FIG. 2, the second main surface-side external electrode 412B of the second external electrode 40B includes a second main surface-side recess 520B as a recess recessed towards the multilayer body 10 side in the LT cross-sectional view. The second main surface-side recess 520B is provided on the surface of the second main surface-side external electrode 412B. The shape of the second main surface-side recess 520B is a groove extending in the width direction W orthogonal or substantially orthogonal to the LT cross-section, i.e., in the direction perpendicular or substantially perpendicular to the paper surface of FIG. 2. The second main surface-side recess 520B may be provided over the entire or substantially the entire length of the second main surface-side external electrode 412B along the width direction W. The second main surface-side recess 520B is provided in or adjacent to the approximate center of the second main surface-side external electrode 412B in the length direction L.

FIGS. 4A and 4B illustrate LW cross-sectional views of the multilayer ceramic capacitor 1 and the multilayer body 10 along the length direction L and the width direction W. In the LW cross-sectional views, the first lateral surface-side external electrode 421A of the first external electrode 40A includes a first lateral surface-side recess 530A as a recess recessed towards the multilayer body 10 side. The first lateral surface-side recess 530A is provided on the surface of the first lateral surface-side external electrode 421A. The shape of the first lateral surface-side recess 530A is a groove extending in the lamination direction T orthogonal or substantially orthogonal to the LW cross-section, i. e., in the direction perpendicular or substantially perpendicular to the paper surface of FIGS. 4A and 4B. The first lateral surface-side recess 530A may be provided over the entire or substantially the entire length of the first lateral surface-side external electrode 421A along the lamination direction T. The first lateral surface-side recess 530A is provided in or adjacent to the approximate center of the first lateral surface-side external electrode 421A in the length direction L. The first lateral surface-side recess 530A may communicate with either or both of the first main surface-side recess 510A and the second main surface-side recess 520A, or may not communicate with both.

As illustrated in FIGS. 4A and 4B, the second lateral surface-side external electrode 422A of the first external electrode 40A includes a second lateral surface-side recess 540A as a recess recessed towards the multilayer body 10 side in the LW cross-sectional view. The second lateral surface-side recess 540A is provided on the surface of the second lateral surface-side external electrode 422A. The shape of the second lateral surface-side recess 540A is a groove extending in the lamination direction T orthogonal or substantially orthogonal to the LW cross-section, i.e., in the direction perpendicular or substantially perpendicular to the paper surface of FIGS. 4A and 4B. The second lateral surface-side recess 540A may be provided over the entire or substantially the entire length of the second lateral surface-side external electrode 422A along the lamination direction T. The second lateral surface-side recess 540A is provided in or adjacent to the approximate center of the second lateral surface-side external electrode 422A in the length direction L. The second lateral surface-side recess 540A may communicate with either or both of the first main surface-side recess 510A and the second main surface-side recess 520A, or may not communicate with both.

As illustrated in FIGS. 4A and 4B, the first lateral surface-side external electrode 421B of the second external electrode 40B includes a first lateral surface-side recess 530B as a recess recessed towards the multilayer body 10 side in the LW cross-sectional view. The first lateral surface-side recess 530B is provided on the surface of the first lateral surface-side external electrode 421B. The shape of the first lateral surface-side recess 530B is a groove extending in the lamination direction T orthogonal or substantially orthogonal to the LW cross-section, i.e., in the direction perpendicular or substantially perpendicular to the paper surface of FIGS. 4A and 4B. The first lateral surface-side recess 530B may be provided over the entire or substantially the entire length of the first lateral surface-side external electrode 421B along the lamination direction T. The first lateral surface-side recess 530B is provided in or adjacent to the approximate center of the first lateral surface-side external electrode 421B in the length direction L. The first lateral surface-side recess 530B may communicate with either or both of the first main surface-side recess 510B and the second main surface-side recess 520B, or may not communicate with both.

As illustrated in FIGS. 4A and 4B, the second lateral surface-side external electrode 422B of the second external electrode 40B includes a second lateral surface-side recess 540B as a recess recessed towards the multilayer body 10 side in the LW cross-sectional view. The second lateral surface-side recess 540B is provided on the surface of the second lateral surface-side external electrode 422B. The shape of the second lateral surface-side recess 540B is a groove extending in the lamination direction T orthogonal or substantially orthogonal to the LW cross-section, i.e., in the direction perpendicular or substantially perpendicular to the paper surface of FIGS. 4A and 4B. The second lateral surface-side recess 540B may be provided over the entire or substantially the entire length of the second lateral surface-side external electrode 422B along the lamination direction T. The second lateral surface-side recess 540B is provided in or adjacent to the approximate center of the second lateral surface-side external electrode 422B in the length direction L. The second lateral surface-side recess 540B may communicate with either or both of the first main surface-side recess 510AB and the second main surface-side recess 520AB, or may not communicate with both.

The first main surface-side external electrode 411A and the second main surface-side external electrode 412A of the first external electrode 40A, as well as the first main surface-side external electrode 411B and the second main surface-side external electrode 412B of the second external electrode 40B, share the same or substantially the same configuration. Similarly, the first lateral surface-side external electrode 421A and the second lateral surface-side external electrode 422A of the first external electrode 40A, as well as the first lateral surface-side external electrode 421B and the second lateral surface-side external electrode 422B of the second external electrode 40B, also share the same or substantially the same configuration as the four main surface-side external electrodes 411A, 412A, 411B, and 412B.

The first main surface-side recess 510A and the second main surface-side recess 520A of the first external electrode 40A, as well as the first main surface-side recesses 510B and the second main surface-side recesses 520B of the second external electrode 40B, share the same or substantially the same configuration. Similarly, the first lateral surface-side recess 530A and the second lateral surface-side recess 540A of the first external electrode 40A, as well as the first lateral surface-side recess 530B and the second lateral surface-side recess 540B of the second external electrode 40B, also share the same or substantially the same configuration as the four main surface-side recesses 510A, 520A, 510B, and 520B.

Accordingly, the first main surface-side external electrode 411A and the first main surface-side recess 510A of the first external electrode 40A will be described below, representatively describing the four main surface-side external electrodes, the four main surface-side recesses, the four lateral surface-side external electrodes, and the four lateral surface-side recesses.

The first main surface-side external electrode 411A of the first external electrode 40A corresponds to the second main surface-side external electrode 412A, the first lateral surface-side external electrode 421A, and the second lateral surface-side external electrode 422A of the first external electrode 40A, as well as the first main surface-side external electrode 411B, the second main surface-side external electrode 412B, the first lateral surface-side external electrode 421B, and the second lateral surface-side external electrode 422B of the second external electrode 40B. The first main surface-side recess 510A of the first external electrode 40A corresponds to the second main surface-side recess 520A, the first lateral surface-side recess 530A, and the second lateral surface-side recess 540A of the first external electrode 40A, as well as the first main surface-side recesses 510B, the second main surface-side recesses 520B, the first lateral surface-side recess 530B, and the second lateral surface-side recess 540B of the second external electrode 40B.

The first base electrode layer 50A and the first plated layer 60A of the first external electrode 40A correspond to the second base electrode layer 50B and the second plated layer 60B of the second external electrode 40B. The first Ni plated layer 61A and the first Sn plated layer 62A of the first plated layer 60A of the first external electrode 40A correspond to the second Ni plated layer 61B and the second Sn plated layer 62B of the second plated layer 60B of the second external electrode 40B.

Figure 5A:
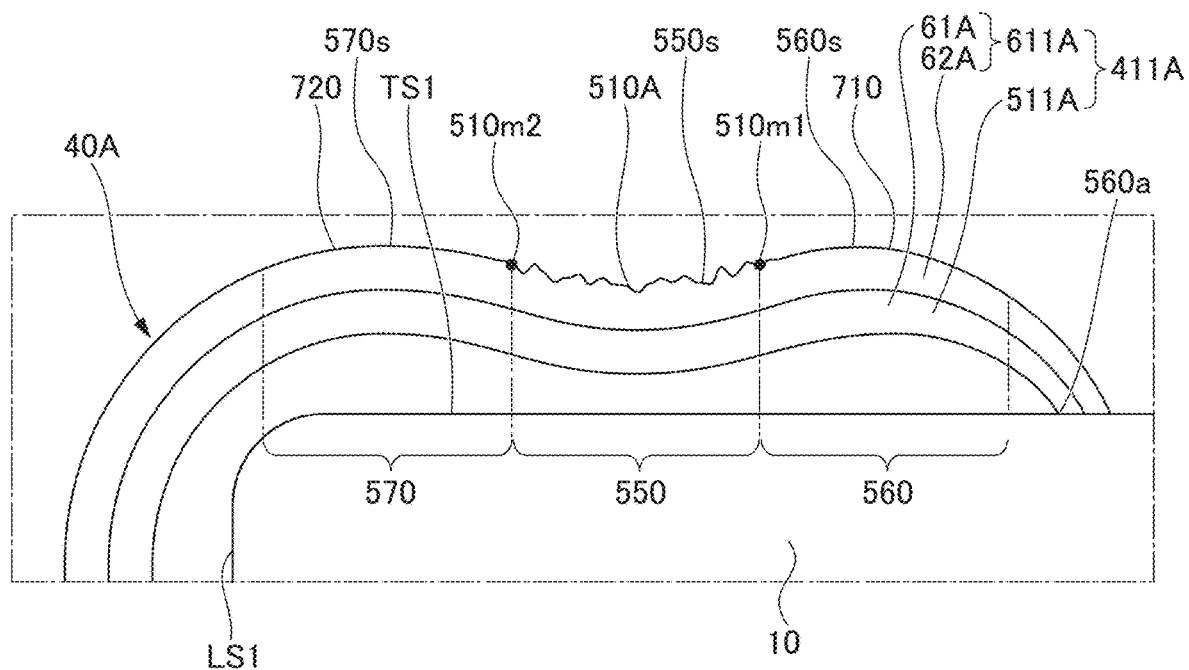
FIG. 5A is an enlarged view of a portion indicated by VA in FIG. 2, illustrating a cross section of a first main surface-side external electrode.
Figure 5B:
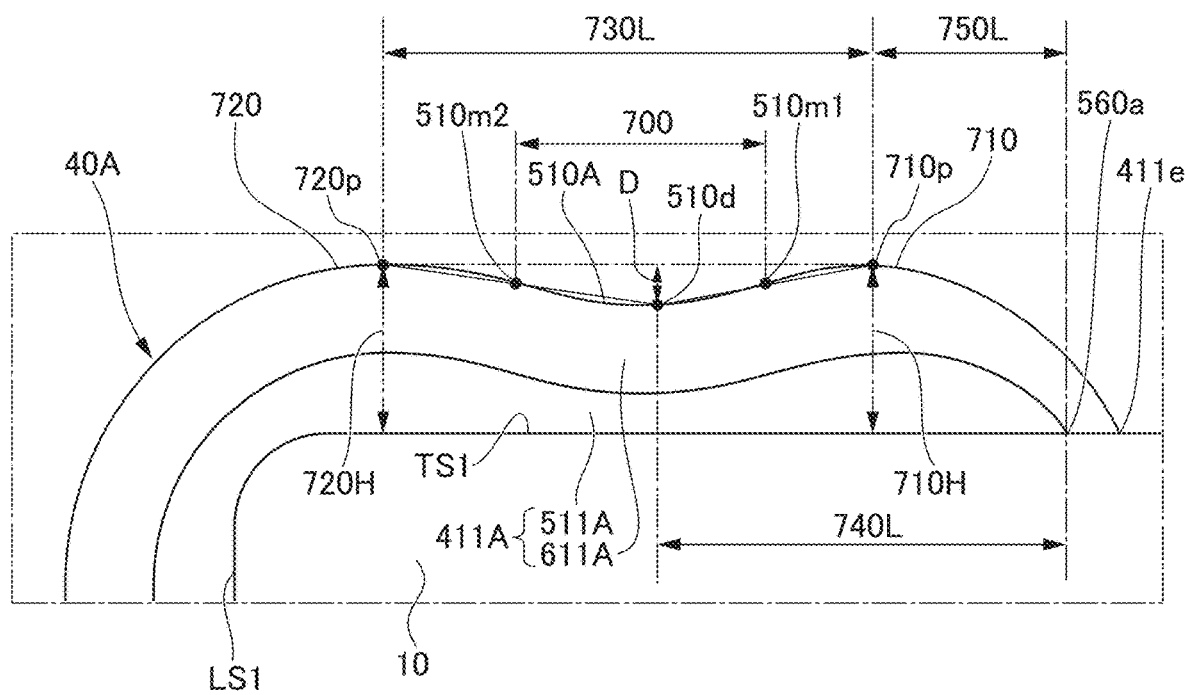
FIG. 5B is a view corresponding to FIG. 5A, illustrating a cross section of the first main surface-side external electrode.

FIG. 5A is an enlarged view of a portion indicated by VA in FIG. 2, illustrating an LT cross-sectional view of the first main surface-side external electrode 411A of the first external electrode 40A. FIG. 5B corresponds to FIG. 5A and illustrates the outer shape of the LT cross-sectional view of the first main surface-side external electrode 411A of the first external electrode 40A. FIGS. 5A and 5B illustrate the same XYZ orthogonal coordinate system as illustrated in FIGS. 1 to 4B.

As illustrated in FIG. 5A, the first main surface-side external electrode 411A of the first external electrode 40A includes the first main surface-side base electrode layer 511A provided on the first main surface TS1, and the first main surface-side plated layer 611A including the first Ni plated layer 61A and the first Sn plated layer 62A. The three layers, which include the first Sn plated layer 62A of the outermost first main surface-side plated layer 611A, the first Ni plated layer 61A as a lower layer below the first Sn plated layer 62A, and the first main surface-side base electrode layer 511A as a lower layer below the first Ni plated layer 61A, are recessed towards the multilayer body 10 side in the lamination direction T (the Z direction in FIGS. 5A and 5B), thus defining the first main surface-side recess 510A.

Therefore, the thickness of the first main surface-side base electrode layer 511A in the lamination direction T is minimized in the portion corresponding to the first main surface-side recess 510A. In the present example embodiment, the maximum thickness of the first main surface-side base electrode layer 511A is preferably, for example, between about 15 μm and about 30 μm inclusive.

As illustrated in FIG. 5A, in the LT cross-sectional view, the main surface-side external electrode 411A of the first external electrode 40A includes the first main surface-side recess 510A, an inner peripheral region 560, and an outer peripheral region 570 as peripheral regions adjacent to the first main surface-side recess 510A in the length direction L (corresponding to the X direction in FIG. 5A).

The first main surface-side recess 510A is a portion of the region 700 recessed towards the multilayer body 10 side in the length direction L, as will be described later with reference to FIG. 5B, and is illustrated as a recessed region 550 in FIG. 5A.

The inner peripheral region 560 within the first main surface-side external electrode 411A is a region to the inner side of the first main surface-side recess 510A in the length direction L, specifically a region to the central side of the multilayer body 10 in the length direction L (to the side distant from the first end surface LS1 in the length direction L), continuing from the recessed region 550 over a range substantially equivalent to the recessed region 550 in the length direction L.

The outer peripheral region 570 within the first main surface-side external electrode 411A is a region to the outer side of the first main surface-side recess 510A in the length direction L, specifically a region to the outer side of the multilayer body 10 in the length direction L (to the side closer to the first end surface LS1 in the length direction L), continuing from the recessed region 550 over a range equivalent or substantially equivalent to the recessed region 550 in the length direction L.

As illustrated in FIG. 5B, the surface of the first main surface-side external electrode 411A includes the first main surface-side recess 510A, an inner bulge 710 extending to the inner side of the first main surface-side recess 510A, and a second bulge 720 extending to the outer side of the first main surface-side recess 510A. The first bulge 710 is a region corresponding to the inner peripheral region 560. The second bulge 720 is a region corresponding to the outer peripheral region 570.

The reference number 700 in FIG. 5B represents a region of the first main surface-side recess 510A (recessed region 550) in the length direction L, in the present example embodiment. The region 700 of the first main surface-side recess 510A in the length direction L is based on the distance in the length direction L between a first midpoint 510m1, which connects a deepest portion 510d of the first main surface-side recess 510A to a vertex 710p of the first bulge 710, and a second midpoint 510m2, which connects the deepest portion 510d of the first main surface-side recess 510A to a vertex 720p of the second bulge 720. The deepest portion 510d of the first main surface-side recess 510A refers to the portion closest to the first main surface TS1 of the multilayer body 10 in the lamination direction T, in the first main surface-side recess 510A. The vertex 710p of the first bulge 710 is the point farthest from the first main surface TS1 of the multilayer body 10 in the lamination direction T, on the surface of the first bulge 710. The vertex 720p of the second bulge 720 is the point farthest from the first main surface TS1 of the multilayer body 10 in the lamination direction T, on the surface of the second bulge 720.

The distance between the vertex 710p of the first bulge 710 and the first main surface TS1 of the multilayer body 10 in the lamination direction T is the height 710H of the first bulge 710. The distance between the vertex 720p of the second bulge 720 and the first main surface TS1 of the multilayer body 10 in the lamination direction T is the height 720H of the second bulge 720. In the present example embodiment, the height 710H of the first bulge 710 and the height 720H of the second bulge 720 may be the same or different. In the cases of being different, the height 710H of the first bulge 710 may be higher or lower than the height 720H of the second bulge 720.

As illustrated in FIG. 5B, in the present example embodiment, the depth D of the first main surface-side recess 510A refers to the shortest distance between the deepest portion 510d and the line connecting the vertex 710p of the first bulge 710 and the vertex 720p of the second bulge 720.

In the present example embodiment, the depth D of the first main surface-side recess 510A is preferably, for example, between about 3 μm and about 10 μm inclusive.

In the present example embodiment, the depth D of the first main surface-side recess 510A is preferably greater than the thickness of the Ni plated layer 61A in the lamination direction T.

As illustrated in FIG. 5B, in the present example embodiment, the distance 730L between the vertex 710p of the first bulge 710 and the vertex 720p of the second bulge 720 in the length direction L is preferably, for example, between about 120 μm and about 150 μm inclusive. The distance 730L is preferably greater than the maximum thickness of the first main surface-side base electrode layer 511A.

As illustrated in FIG. 5B, in the present example embodiment, the distance 740L between the inner end 560a of the first main surface-side base electrode layer 511A and the deepest portion 510d of the first main surface-side recess 510A in the length direction L is preferably, for example, between about 110 µm and about 130 µm inclusive.

As illustrated in FIG. 5B, in the present example embodiment, the distance 750L between the inner end 560a of the first main surface-side base electrode layer 511A and the vertex 710p of the first bulge 710 in the length direction L is preferably, for example, between about 70 µm and about 90 µm inclusive.

In the first main surface-side external electrode 411A of the present example embodiment, the surface roughness Ra of the surface 550s of the first main surface-side recess 510A is rougher than the surface roughness Ra of the surface 560s of the inner peripheral region 560 corresponding to the first bulge 710, and rougher than the surface roughness Ra of the surface 570s of the outer peripheral region 570 corresponding to the second bulge 720.

The surface roughness Ra of the surface 550s of the first main surface-side recess 510A is preferably, for example, about 0.7 µm or more, and more preferably between about 0.7 µm and about 1.4 µm inclusive. The surface roughness Ra is even more preferably, for example, between about 1.0 µm and about 1.4 µm inclusive.

The surface roughness Ra of the surface 560s of the inner peripheral region 560 and the surface roughness Ra of the surface 570s of the outer peripheral region 570 are preferably, for example, about 0.5 µm or less, and more preferably between about 0.2 µm and about 0.5 µm inclusive. The surface roughness Ra is even more preferably, for example, between about 0.4 µm and about 0.5 µm inclusive.

In the multilayer ceramic capacitor 1 of the present example embodiment, the first main surface-side external electrode 411A of the first external electrode 40A includes the first main surface-side recess 510A. The first main surface-side external electrode 411A includes the inner peripheral region 560 as an inner region in the length direction L, and the outer peripheral region 570 as an outer region in the length direction L, in relation to the first main surface-side recess 510A. The surface roughness Ra of the surface 550s of the first main surface-side recess 510A is rougher than the surface roughness Ra of the surface 560s of the inner peripheral region 560, and rougher than the surface roughness Ra of the surface 570s of the outer peripheral region 570.

The multilayer ceramic capacitor 1 of the present example embodiment is mounted on a board. Mounting on the board may involve, for example, soldering the external electrodes 40 to the terminals of the board. In the case of attaching the first main surface-side external electrode 411A to the board by soldering, the flexural stress occurring in the first main surface-side external electrode 411A particularly concentrates on the inner end portion 411e of the first main surface-side external electrode 411A illustrated in FIG. 5B, or on the inner end 560a of the first main surface-side base electrode layer 511A, and is transmitted as tensile stress to the multilayer body 10; as a result, cracks or the like may occur in the multilayer body 10. In the multilayer ceramic capacitor 1 of the present example embodiment, since the first main surface-side external electrode 411A includes the first main surface-side recess 510A, a recess corresponding to the first main surface-side recess 510A is also provided in the first main surface-side base electrode layer 511A. Consequently, the total amount of the first main surface-side base electrode layer 511A can be reduced compared to the case of lacking the first main surface-side recess 510A. The reduction in the total amount results in a decrease in the flexural stress caused by the tensile stress concentrated at the inner end portion 411e or the end 560a. This enables improved flexural resistance of the multilayer ceramic capacitor 1, and consequently reduces or prevents the occurrence of cracks or the like in the multilayer body 10.

When the first main surface-side external electrode 411A is soldered to the board, solder enters between the first main surface-side external electrode 411A and the board. This solder comes into contact with the surface of the first main surface-side external electrode 411A, and a larger contact area causes greater bending stress to the first main surface-side external electrode 411A, leading to a risk of cracks or the like occurring in the multilayer body 10. In the present example embodiment, the surface roughness Ra of the surface 550s of the first main surface-side recess 510A is rougher than the surface roughness Ra of the surface 560s of the inner peripheral region 560, and rougher than the surface roughness Ra of the surface 570s of the outer peripheral region 570. As a result, the solder is less likely to wet and fully contact the surface 550s of the first main surface-side recess 510A, and the contact area of the solder with the surface 550s of the first main surface-side recess 510A is smaller than the surface 560s of the inner peripheral region 560 and the surface 570s of the outer peripheral region 570. Consequently, reducing the contact area of the solder with the entire or substantially the entire surface of the first main surface-side external electrode 411A enables a reduction in the tensile stress caused by the bending stress concentrated at the inner end portion 411e or the end 560a, and consequently reduces or prevents the occurrence of cracks or the like in the multilayer body 10. The bonding force of the solder is secured by the surface 560s of the inner peripheral region 560 and the surface 570s of the outer peripheral region 570, where the contact area of the solder is relatively large.

Next, an example of a method of measuring the surface roughness Ra of the first main surface-side external electrode 411A, and the depth D of the first main surface-side recess 510A will be described.

First, the method of measuring the surface roughness Ra (arithmetic mean roughness Ra) of the first main surface-side external electrode 411A will be described. Using a laser microscope (for example, manufactured by Keyence Corporation (registered trademark), VK-X1000, magnification 20×), the surfaces of the first main surface-side recess 510A (recessed region 550), the inner peripheral region 560, and the outer peripheral region 570 are scanned with a laser to obtain images of each surface. Subsequently, the surface roughness Ra of each surface is measured using analysis software (for example, manufactured by Keyence Corporation (registered trademark), Multi-File Analysis Application).

Next, the following describes an example of a method of measuring the depth D of the first main surface-side recess 510A.

The multilayer ceramic capacitor 1 is polished from either the first lateral surface WS1 or the second lateral surface WS2 to approximately half the width dimension W. As a result, the LT cross section is exposed in the middle of the multilayer ceramic capacitor 1 in the width direction W. Next, the depth D of the first main surface-side recess 510A in the LT cross section exposed by polishing is measured using a digital microscope. As a result, the depth D of the first main surface-side recess 510A is confirmed.

Next, an example of a method of manufacturing the multilayer ceramic capacitor 1 according to the present example embodiment will be described. The method of manufacturing the multilayer ceramic capacitor 1 according to the present example embodiment is not limited, as long as the requirements described above are satisfied. However, a preferable manufacturing method includes the following steps. The details of each step are described below.

A dielectric sheet for the dielectric layer 20 and a conductive paste for the internal electrode layer 30 are prepared. Both of the dielectric sheet for the dielectric layer 20 and the conductive paste for the internal electrode layer 30 include binders and solvents. The binders and solvents may be any known ones. The conductive paste is, for example, obtained by adding organic binders and organic solvents to metal powders.

The conductive paste for the internal electrode layer 30 is printed in a predetermined pattern on the dielectric sheet, for example, by screen printing or gravure printing. As a result, a dielectric sheet with a pattern of the first internal electrode layer 31 and a dielectric sheet with a pattern of the second internal electrode layer 32 are prepared.

A predetermined number of dielectric sheets without a printed pattern of the internal electrode layer 30 are stacked, thus forming a portion that becomes the first main surface-side outer layer portion 12 on the first main surface TS1 side. On top of this, the dielectric sheet with the pattern of the first internal electrode layer 31 and the dielectric sheet with the pattern of the second internal electrode layer 32 are sequentially stacked alternately. As a result, a portion that becomes the inner layer portion 11 is formed. A predetermined number of dielectric sheets without the printed pattern of the internal electrode layer 30 are stacked on top of the portion that becomes the inner layer portion 11, thereby forming a portion that becomes the second main surface-side outer layer portion 13 on the second main surface TS2 side. As a result, a multilayer sheet is produced.

The multilayer sheet is pressed in the lamination direction, for example, by hydrostatic pressure pressing, to produce a multilayer block.

The multilayer block is cut into individual pieces to obtain a plurality of multilayer chips. Subsequently, the multilayer chips may be polished, for example, by barrel polishing, to round the corners and edges.

The multilayer chips are fired to produce the multilayer body 10. The firing temperature in this case is preferably, for example, between about 900° C. and about 1400° C. inclusive, depending on the materials of the dielectric layer 20 and the internal electrode layer 30.

The first external electrode 40A and the second external electrode 40B are formed as follows on the end surfaces of the multilayer body 10.

A conductive paste, which becomes the first base electrode layer 50A, is applied to the first end surface LS1 side of the multilayer body 10. A conductive paste, which becomes the second base electrode layer 50B, is applied to the second end surface LS2 side of the multilayer body 10. In the present example embodiment, the first base electrode layer 50A and the second base electrode layer 50B are fired layers. The fired layers are formed by applying a conductive paste containing glass components and metal to the multilayer body 10, for example, by a method such as dipping, followed by firing. The firing temperature in this case is preferably, for example, between about 700° C. and about 950° C. inclusive.

The first base electrode layer 50A and the second base electrode layer 50B are preferably fired layers. This allows for relatively simply forming the first base electrode layer 50A and the second base electrode layer 50B, as compared to thin film formation methods such as, for example, sputtering or evaporation.

In the present example embodiment, a conductive paste, which becomes the first main surface-side base electrode layer 511A of the first base electrode layer 50A, is applied by dipping to extend from the first end surface LS1 of the multilayer body 10 to a portion of the first main surface TS1, and a conductive paste, which becomes the second main surface-side base electrode layer 512A of the first base electrode layer 50A, is applied by dipping to extend from the first end surface LS1 of the multilayer body 10 to a portion of the second main surface TS2.

Similarly, in the present example embodiment, a conductive paste, which becomes the first main surface-side base electrode layer 511B of the second base electrode layer 50B, is applied by dipping to extend from the second end surface LS2 of the multilayer body 10 to a portion of the first main surface TS1, and a conductive paste, which becomes the second main surface-side base electrode layer 512B of the second base electrode layer 50B, is applied by dipping to extend from the second end surface LS2 of the multilayer body 10 to a portion of the second main surface TS2.

In this case, a conductive paste, which becomes the first lateral surface-side base electrode layer 521A of the first base electrode layer 50A, is preferably applied by dipping to extend from the first end surface LS1 of the multilayer body 10 to a portion of the first lateral surface WS1, and a conductive paste, which becomes the second lateral surface-side base electrode layer 522A of the first base electrode layer 50A, is preferably applied by dipping to extend from the first end surface LS1 of the multilayer body 10 to a portion of the second lateral surface WS2.

Similarly, in this case, a conductive paste, which becomes the first lateral surface-side base electrode layer 521B of the second base electrode layer 50B, is preferably applied by dipping to extend from the second end surface LS2 of the multilayer body 10 to a portion of the first lateral surface WS1, and a conductive paste, which becomes the second lateral surface-side base electrode layer 522B of the second base electrode layer 50B, is preferably applied by dipping to extend from the second end surface LS2 of the multilayer body 10 to a portion of the second lateral surface WS2.

The pre-firing multilayer chips and the conductive paste applied to the multilayer chips may be simultaneously fired. In this case, the fired layers are preferably formed by firing a material including a ceramic material instead of glass components. In this case, as the ceramic material to be added, a ceramic material of the same type as the dielectric layer 20 is preferably used. In this case, a conductive paste is applied to the pre-firing multilayer chips, and the multilayer chips as well as the conductive paste applied to the multilayer chips are simultaneously fired, thus forming the multilayer body 10 with the fired layers. The multilayer body 10 is fired simultaneously with forming the fired layers, allowing for simplifying the manufacturing steps.

Subsequently, a plating treatment is performed on the surfaces of the first base electrode layer 50A and the second base electrode layer 50B including the fired layers. In the present example embodiment, the first plated layer 60A is formed on the surface of the first base electrode layer 50A. The second plated layer 60B is formed on the surface of the second base electrode layer 50B. In the present example embodiment, the first Ni plated layer 61A is formed on the surface of the first base electrode layer 50A, and the first Sn plated layer 62A is formed on the surface of the first Ni plated layer 61A. In the present example embodiment, the second Ni plated layer 61B is formed on the surface of the second base electrode layer 50B, and the second Sn plated layer 62B is formed on the surface of the second Ni plated layer 61B.

In performing the plating treatment, either electrolytic plating or electroless plating may be used. However, electroless plating requires pretreatment with catalysts to improve the plating deposition rate, involving a drawback of increased complexity of the steps. Therefore, electrolytic plating is preferable in most cases. The Ni plated layer and the Sn plated layer are preferably sequentially formed, for example, by barrel plating.

When the electrically conductive resin layer is provided, the electrically conductive resin layer may cover the fired layer. When the electrically conductive resin layer is provided, an electrically conductive resin paste including, for example, a thermosetting resin and a metal component is applied on the fired layer, and then heat treatment is performed at a temperature of, for example, about 250° C. to about 550° C. or higher. Thus, the thermosetting resin is thermally cured to form the electrically conductive resin layer. The atmosphere during the heat treatment is preferably, for example, an N2 atmosphere. Furthermore, in order to prevent scattering of the resin and to prevent oxidation of various metal components, the oxygen concentration preferably, for example, about 100 ppm or less.

Here, for example, the following examples of methods may be used to obtain the recess with a groove shape on the main surface-side external electrode and the lateral surface-side external electrode of the external electrode 40, as in the present example embodiment.

Figure 6A:
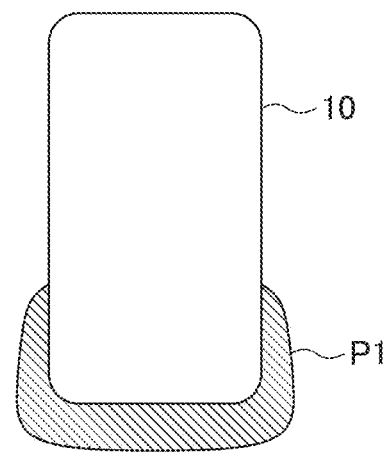
FIG. 6A is a diagram illustrating a method of manufacturing a multilayer ceramic capacitor according to an example embodiment of the present invention, illustrating a first step of forming external electrodes on the multilayer body.
Figure 6B:
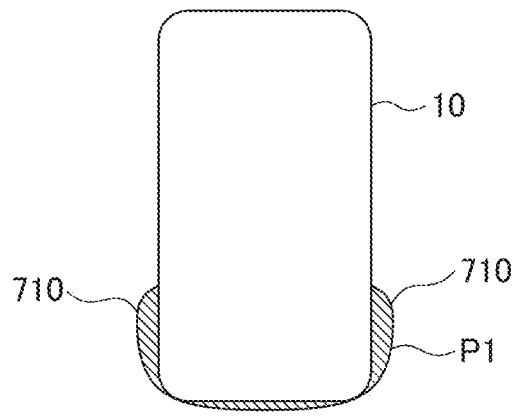
FIG. 6B is a diagram illustrating a method of manufacturing a multilayer ceramic capacitor to an example embodiment of the present invention, illustrating a second step of forming external electrodes on the multilayer body.
Figure 6C:
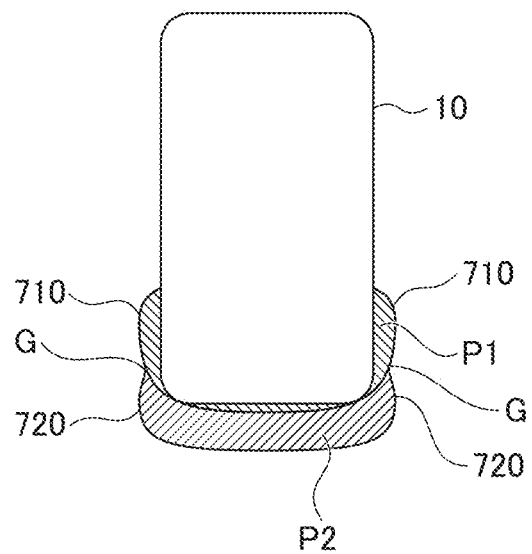
FIG. 6C is a diagram illustrating a method of manufacturing a multilayer ceramic capacitor according to an example embodiment of the present invention, illustrating a third step of forming external electrodes on the multilayer body.

FIGS. 6A to 6C schematically illustrate the steps of forming the base electrode layer. Firstly, as illustrated in FIG. 6A, a first conductive paste P1, which becomes the base electrode layer, is applied by dipping to the end of the multilayer body 10 in the length direction L. The first conductive paste P1 used herein typically has relatively high viscosity. Next, as illustrated in FIG. 6B, the first conductive paste P1 at and near the end surface of the multilayer body 10 is removed, forming the first bulge 710. Subsequently, as illustrated in FIG. 6C, a second conductive paste P2 with relatively low viscosity is shallowly applied by dipping up to the front of the first bulge 710. As a result, the second bulge 720 is formed, and a recess G is formed between the second bulge 720 and the first bulge 710. The recess G becomes the first main surface-side recess 510A, the second main surface-side recess 520A, the first lateral surface-side recess 530A, the second lateral surface-side recess 540A, the first main surface-side recess 510B, the second main surface-side recess 520B, the first lateral surface-side recess 530B, and the second lateral surface-side recess 540B.

For example, the following methods can be used to control the surface roughness of the main surface-side external electrode and the lateral surface-side external electrode of the external electrodes 40 as in the present example embodiment, i.e., making the surface roughness of the recess rougher than the surface roughness of the peripheral regions.

Barrel polishing is performed after forming the external electrodes. The size of the recess, the size of the media used for barrel polishing, and the conditions of barrel polishing are adjusted, thus adjusting the contact conditions of the media with the surface of the recess and the surface the peripheral regions, ensuring that the surface of the recess becomes rougher than the surface of the peripheral regions. For example, barrel polishing is performed while masking the surface of the recess such that the surface of the recess is not polished and the surface of the peripheral regions is polished, such that the surface roughness of the recess can become rougher than the surface roughness of the peripheral regions.

The multilayer ceramic capacitor 1 may be manufactured through the manufacturing steps described above.

The configurations of the multilayer ceramic capacitor 1 is not limited to those illustrated in FIGS. 1 to 4B. For example, the multilayer ceramic capacitor 1 may include a two-portion structure, a three-portion structure, or a four-portion structure as illustrated in FIGS. 7A to 7C.

Figure 7A:
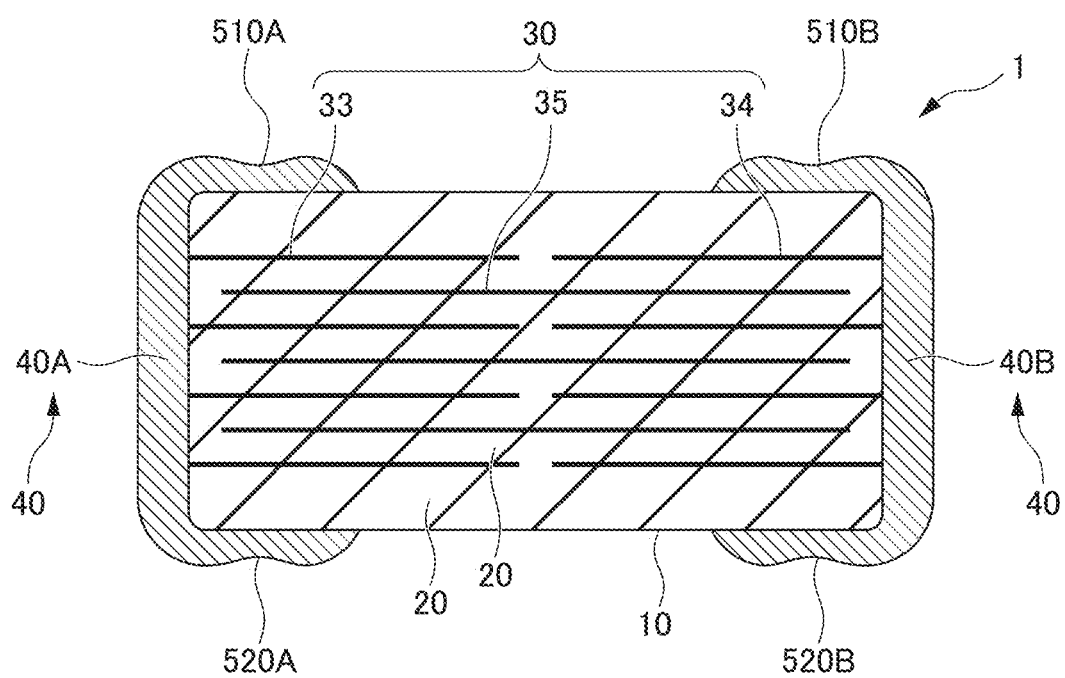
FIG. 7A illustrates a multilayer ceramic capacitor according to an example embodiment of the present invention with a two-portion structure.

The multilayer ceramic capacitor 1 illustrated in FIG. 7A includes a two-portion structure, equipped with a floating internal electrode layer 35 as a floating inner conductive layer that does not extend to either the first end surface LS1 or the second end surface LS2, in addition to the first internal electrode layer 33 and the second internal electrode layer 34 as the internal electrode layer 30.

Figure 7B:
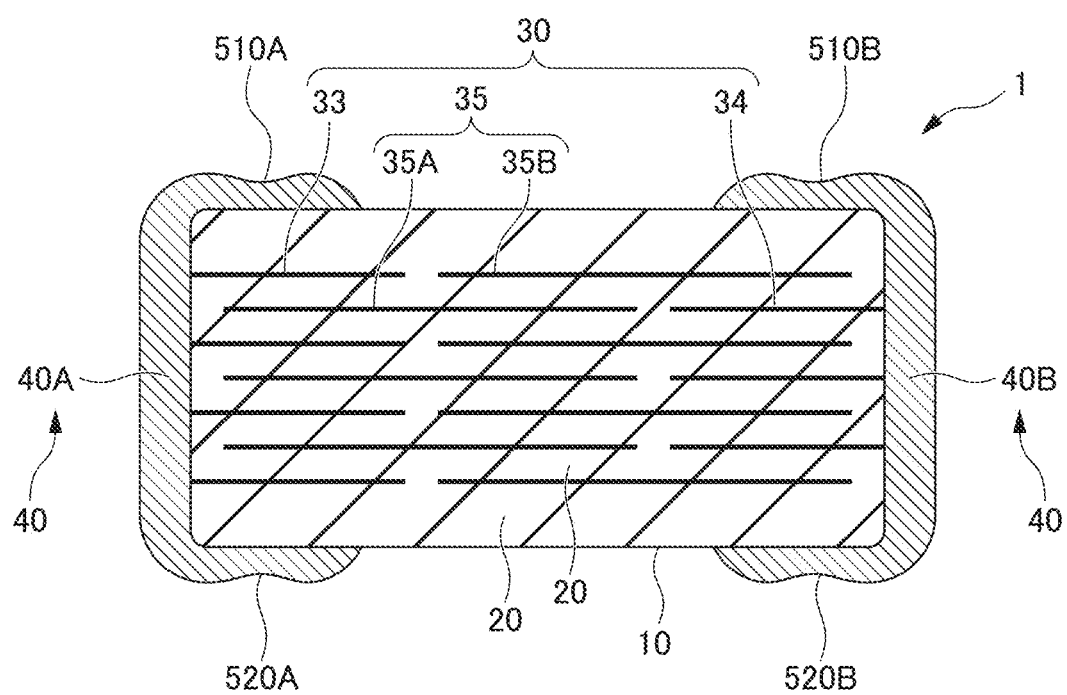
FIG. 7B illustrates a multilayer ceramic capacitor according to an example embodiment of the present invention with a three-portion structure.

The multilayer ceramic capacitor 1 illustrated in FIG. 7B includes a three-portion structure, equipped with a first floating internal electrode layer 35A and a second floating internal electrode layer 35B, as the floating internal electrode layer 35.

Figure 7C:
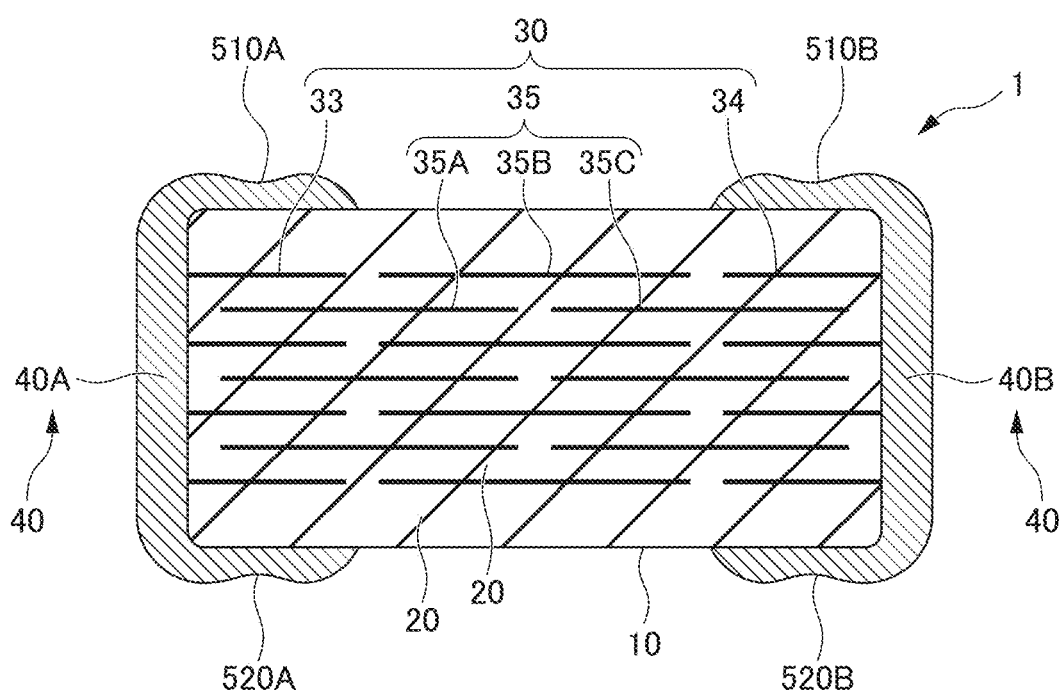
FIG. 7C illustrates a multilayer ceramic capacitor according to an example embodiment of the present invention with a four-portion structure.

The multilayer ceramic capacitor 1 illustrated in FIG. 7C includes a four-portion structure, equipped with the first floating internal electrode layer 35A, the second floating internal electrode layer 35B, and a third floating internal electrode layer 35C, as the floating internal electrode layer 35.

The multilayer ceramic capacitor 1 can be structured with a plurality of divided counter electrode portions by providing the floating internal electrode layers 35 as the internal electrode layer 30. As a result, a plurality of capacitor components are provided between the counter internal electrode layers 30, and the capacitor components are connected in series. Therefore, the voltage applied to each capacitor component is reduced, allowing for achieving high withstand voltage of the multilayer ceramic capacitor 1. The multilayer ceramic capacitor 1 in the present example embodiment may include a multi-portion structure including four or more portions.

In the multilayer ceramic capacitor 1 with the structures illustrated in FIGS. 7A to 7C, similar to the present example embodiment described above, the first external electrode 40A includes the first main surface-side recess 510A and the second main surface-side recess 520A, while the second external electrode 40B includes the first main surface-side recess 510B and the second main surface-side recess 520B. The surface roughness of the recesses is preferably rougher than the surface roughness of the peripheral regions of the recesses.

In the multilayer ceramic capacitor 1 with the structures illustrated in FIGS. 7A to 7C, similar to the present example embodiment described above, the first external electrode 40A may include the first lateral surface-side recess 530A and the second lateral surface-side recess 540A, while the second external electrode 40B may include the first lateral surface-side recess 530B and the second lateral surface-side recess 540B. The surface roughness of the recesses is preferably rougher than the surface roughness of the peripheral regions of the recesses.

In particular, the multilayer ceramic capacitors 1 with the structures such as the two-portion structure, the three-portion structure, and the four-portion structure including the floating internal electrode layer 35 illustrated in FIGS. 7A to 7C are effective for use under high voltage. However, compressive stress is preferably applied to the multilayer body 10 as an electrostrictive countermeasure under high voltage, and in order to achieve this, the plating thickness of the external electrodes on the main surfaces and the lateral surfaces of the multilayer body 10 is increased. However, this case involves a problem of deteriorating the flexural resistance due to increased tensile stress on the inner end portion 411e and the inner end 560a of the external electrode 40 illustrated in FIG. 5B. However, for example, as in the present example embodiment, the recesses (first main surface-side recess, second main surface-side recess) are provided to the main surface-side external electrode, and the surface roughness of the recesses is made rougher than the surface roughness of the peripheral regions, thus improving the flexural resistance, and consequently reducing or preventing the occurrence of cracks or the like in the multilayer body 10.

The multilayer ceramic capacitor 1 according to the present example embodiment described above achieves the following advantageous effects.

The multilayer ceramic capacitor 1 according to the present example embodiment includes the plurality of dielectric layers 20 as the plurality of ceramic layers, and the plurality of internal electrode layers 30 as the plurality of inner conductive layers, both of which are stacked alternately in the lamination direction T. The multilayer ceramic capacitor 1 also includes the multilayer body 10 and the pair of external electrodes 40. The multilayer body 10 includes the first main surface TS1 and the second main surface TS2 on opposite sides in the lamination direction T, the first end surface LS1 and the second end surface LS2 on opposite sides in the length direction L orthogonal or substantially orthogonal to the lamination direction T, and the first lateral surface WS1 and the second lateral surface WS2 on opposite sides in the width direction W orthogonal or substantially orthogonal to both the lamination direction T and the length direction L. The pair of external electrodes 40 are spaced apart from each other at both ends of the multilayer body 10 in the length direction L. The internal electrode layer 30 includes the first internal electrode layer 31 as the first inner conductive layer extending to the first end surface LS1, and the second internal electrode layer 32 as the second inner conductive layer extending to the second end surface LS2. The external electrodes 40 include the first main surface-side external electrode 411A, the second main surface-side external electrode 412A, the first main surface-side external electrode 411B, and the second main surface-side external electrode 412B, as the main surface-side external electrodes provided on the first main surface TS1 and the second main surface TS2, respectively. The first main surface-side external electrode 411A, the second main surface-side external electrode 412A, the first main surface-side external electrode 411B, and the second main surface-side external electrode 412B include the first main surface-side recess 510A, the second main surface-side recess 520A, the first main surface-side recess 510B, and the second main surface-side recess 520B, respectively, as the recesses recessed towards the multilayer body 10 side in the cross-sectional view along the lamination direction T and the length direction L, as well as the inner peripheral region 560 and the outer peripheral region 570 as the peripheral regions adjacent to the recess in the length direction L. The surface roughness Ra of the first main surface-side recess 510A, the second main surface-side recess 520A, the first main surface-side recess 510B, and the second main surface-side recess 520B is rougher than the surface roughness of the inner peripheral region 560 and the outer peripheral region 570.

This enables an improvement of the flexural resistance of the multilayer ceramic capacitor 1 when mounted on a board, and consequently reduces or prevents the occurrence of cracks or the like in the multilayer body 10.

In the multilayer ceramic capacitor 1 according to the present example embodiment, the surface roughness Ra of the first main surface-side recess 510A, the second main surface-side recess 520A, the first main surface-side recess 510B, and the second main surface-side recess 520B may preferably be between about 0.7 μm and about 1.4 μm inclusive.

This enables an improvement of the flexural resistance when mounted on a board, and consequently reduces or prevents the occurrence of cracks or the like in the multilayer body 10.

In the multilayer ceramic capacitor 1 according to the present example embodiment, the surface roughness Ra of the inner peripheral region 560 and the surface roughness Ra of the outer peripheral region 570 may preferably be between about 0.2 μm and about 0.5 μm inclusive.

This enables an improvement of the flexural resistance when mounted on a board, and consequently reduces or prevents the occurrence of cracks or the like in the multilayer body 10.

In the multilayer ceramic capacitor 1 according to the present example embodiment, the internal electrode layer 30 may include the floating internal electrode layer 35 as the floating inner conductive layer, which does not extend to either the first end surface LS1 or the second end surface LS2, and which faces at least one of the first internal electrode layer 31 or the second internal electrode layer 32 across the dielectric layer 20.

This achieves a high withstand voltage of the multilayer ceramic capacitor 1.

In the multilayer ceramic capacitor 1 according to the present example embodiment, each of the first external electrode 40A and the second external electrode 40B may include the lateral surface-side external electrode, the lateral surface-side external electrode may also include a recess similar to that of the main surface-side external electrode, and the surface roughness of the recess may be rougher than the surface roughness of the peripheral regions.

In other words, the multilayer ceramic capacitor 1 of the present example embodiment includes the multilayer body 10. The multilayer body 10 includes the plurality of dielectric layers 20 as the plurality of ceramic layers, and the plurality of internal electrode layers 30 as the plurality of inner conductive layers, both of which are stacked alternately in the lamination direction T. The multilayer body 10 also includes the first main surface TS1 and the second main surface TS2 on opposite sides in the lamination direction T, the first end surface LS1 and the second end surface LS2 on opposite sides in the length direction L orthogonal or substantially orthogonal to the lamination direction T, and the first lateral surface WS1 and the second lateral surface WS2 on opposite sides in the width direction W orthogonal or substantially orthogonal to both the lamination direction T and the length direction L. The multilayer body 10 also includes the pair of external electrodes 40 provided spaced apart from each other at both ends of the multilayer body 10 in the length direction L. The internal electrode layer 30 includes the first internal electrode layer 31 as a first inner conductive layer extending to the first end surface LS1, and the second internal electrode layer 32 as a second inner conductive layer extending to the second end surface LS2. The external electrodes 40 include the lateral surface-side external electrode provided on at least one of the first lateral surface WS1 or the second lateral surface WS2. The lateral surface-side external electrode includes the recess recessed towards the multilayer body side in a cross-sectional view along the lamination direction and the length direction, and the peripheral regions adjacent to the recess in the length direction. The surface roughness of the recess is rougher than the surface roughness of the peripheral regions.

The present invention is not limited to the configurations of the example embodiments and can be appropriately modified and applied within the scope that does not change the essence of the present invention. Combinations of two or more of any individual preferable configurations described in the example embodiments are also considered a portion of the present invention.

For example, the multilayer ceramic capacitor 1 may be of a two-terminal capacitor including two external electrodes or a multi-terminal capacitor including a plurality of external electrodes.

In the example embodiments, the multilayer ceramic capacitor using dielectric ceramics has been described as an example of the multilayer ceramic electronic component. However, the multilayer ceramic electronic component disclosed herein is not limited to this, and various multilayer ceramic electronic components such as, for example, piezoelectric components using piezoelectric ceramics, thermistors using semiconductor ceramics, and inductors using magnetic ceramics can also be applied. Examples of piezoelectric ceramics may include PZT (lead zirconate titanate) ceramics, examples of semiconductor ceramics may include spinel ceramics, and examples of magnetic ceramics may include ferrites.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component, comprising:
   a multilayer body including a plurality of ceramic layers and a plurality of inner conductive layers stacked alternately in a lamination direction, first and second main surfaces on opposite sides in the lamination direction, first and second end surfaces on opposite sides in a length direction orthogonal or substantially orthogonal to the lamination direction, and first and second lateral surfaces on opposite sides in a width direction orthogonal or substantially orthogonal to both the lamination direction and the length direction; and
   a pair of external electrodes spaced apart from each other at both of the first and second end surfaces in the length direction; wherein
   the plurality of inner conductive layers include a first inner conductive layer extending to the first end surface, and a second inner conductive layer extending to the second end surface;
   the pair of external electrodes include a main surface-side external electrode on at least one of the first main surface or the second main surface;
   the main surface-side external electrode includes a recess recessed towards a multilayer body side in a cross-sectional view along the lamination direction and the length direction, and a peripheral region adjacent to the recess in the length direction; and
   a surface roughness of the recess is rougher than a surface roughness of the peripheral region.

2. The multilayer ceramic electronic component according to claim 1, wherein the surface roughness of the recess is between about 0.7 μm and about 1.4 μm inclusive.

3. The multilayer ceramic electronic component according to claim 2, wherein the surface roughness of the peripheral region is between about 0.2 μm and about 0.5 μm inclusive.

4. The multilayer ceramic electronic component according to claim 1, wherein the plurality of inner conductive layers include a floating inner conductive layer facing at least one of the first inner conductive layer or the second inner conductive layer across the plurality of ceramic layers, the floating inner conductive layer not extending to either of the first or second end surfaces.

5. The multilayer ceramic electronic component according to claim 1, wherein the multilayer body has a rectangular or substantially rectangular shape.

6. The multilayer ceramic electronic component according to claim 1, wherein
   a dimension of the multilayer body in the length direction is between about 0.2 mm and about 10 mm inclusive;
   a dimension of the multilayer body in the lamination direction is between about 0.05 mm and about 10 mm inclusive; and;
   a dimension of the multilayer body in the width direction is between about 0.1 mm and about 10 mm inclusive.

7. The multilayer ceramic electronic component according to claim 1, wherein each of the plurality of ceramic layers includes at least one of $BaTiO_3$, $CaTiO_3$, $SrTiO_3$, or $CaZrO_3$ as a main component.

8. The multilayer ceramic electronic component according to claim 7, wherein each of the plurality of ceramic layers includes at least one of Mn compounds, Fe compounds, Cr compounds, Co compounds, or Ni compounds.

9. The multilayer ceramic electronic component according to claim 1, wherein a thickness of each of the plurality of ceramic layers is between about 0.2 μm and about 15 μm inclusive.

10. The multilayer ceramic electronic component according to claim 1, wherein a number of the plurality of ceramic layers is between 10 and 1200 inclusive.

11. The multilayer ceramic electronic component according to claim 1, wherein each of the plurality of inner conductive layers includes at least one of Ni, Cu, Ag, Pd, or Au, or an alloy including at least one of Ni, Cu, Ag, Pd, or Au.

12. The multilayer ceramic electronic component according to claim 1, wherein a thickness of each of the plurality of inner conductive layers is between about 0.2 μm and about 2.0 μm inclusive.

13. The multilayer ceramic electronic component according to claim 1, wherein a number of the plurality of inner conductive layers is between 10 and 1000 inclusive.

14. The multilayer ceramic electronic component according to claim 1, wherein each of the pair of external electrodes includes a base electrode layer and a plated layer on the base electrode layer.

15. The multilayer ceramic electronic component according to claim 14, wherein the base electrode layer is a fired layer including a metal component and at least one of a glass component and a ceramic component.

16. The multilayer ceramic electronic component according to claim 15, wherein the metal component includes at least one of Cu, Ni, Ag, Pd, Ag—Pd alloy, or Au.

17. The multilayer ceramic electronic component according to claim 15, wherein the glass component includes at least one of B, Si, Ba, Mg, Al, or Li.

18. The multilayer ceramic electronic component according to claim 15, wherein the ceramic component includes at least one of $BaTiO_3$, $CaTiO_3$, $(Ba,Ca)TiO_3$, $SrTiO_3$, or $CaZrO_3$.

19. The multilayer ceramic electronic component according to claim 14, wherein plated layer includes a Ni plated layer on the base electrode layer and a Sn plated layer on the Ni plated layer.

* * * * *